United States Patent [19]
Kojima

[11] Patent Number: 5,570,432
[45] Date of Patent: Oct. 29, 1996

[54] IMAGE CONTROLLER

[75] Inventor: Akio Kojima, Neyagawa, Japan

[73] Assignee: Matsushita Electric Industrial Co., Ltd., Osaka, Japan

[21] Appl. No.: 434,325

[22] Filed: May 2, 1995

Related U.S. Application Data

[63] Continuation of Ser. No. 99,307, Jul. 29, 1993, abandoned.

[30] Foreign Application Priority Data

Aug. 4, 1992 [JP] Japan .................................... 4-20772

[51] Int. Cl.$^6$ ..................................................... G06K 9/40
[52] U.S. Cl. ........................... 382/254; 382/282; 358/453; 358/456; 358/462
[58] Field of Search ..................................... 382/173, 176, 382/180, 237, 254, 264, 266, 267, 268, 269, 307, 282, 283; 358/462, 456, 460, 450, 453; 345/116

[56] References Cited

U.S. PATENT DOCUMENTS

| | | | |
|---|---|---|---|
| 5,073,953 | 12/1991 | Westdijk | 382/9 |
| 5,075,788 | 12/1991 | Funada | 358/462 |
| 5,101,438 | 3/1992 | Kanda et al. | 382/9 |
| 5,243,444 | 9/1993 | Fan | 358/462 |
| 5,299,030 | 3/1994 | Kim | 358/462 |

FOREIGN PATENT DOCUMENTS 5-61971  3/1993  Japan ............................. G06F 15/68

*Primary Examiner*—Leo Boudreau
*Assistant Examiner*—Phuoc Tran
*Attorney, Agent, or Firm*—Ratner & Prestia

[57] ABSTRACT

A computer outputs image data to a control circuit which in turn analyzes the content of the image data and stores pictorial image data, character image data and graphic image data in the separate designated areas of a memory circuit. The image data stored in the memory circuit is output to a halftone processor, and also to a selecting circuit. The output of the halftone processor is also supplied to the selecting circuit. The selecting circuit selects the output of the memory circuit or the output of the halftone processor in accordance with an area signal from the control circuit, and outputting the select signal to an output device, such as a printer. Thus, it is possible to output characters, graphics and halftone pictorial images with high quality even with the use of an image memory of low capacity.

19 Claims, 23 Drawing Sheets

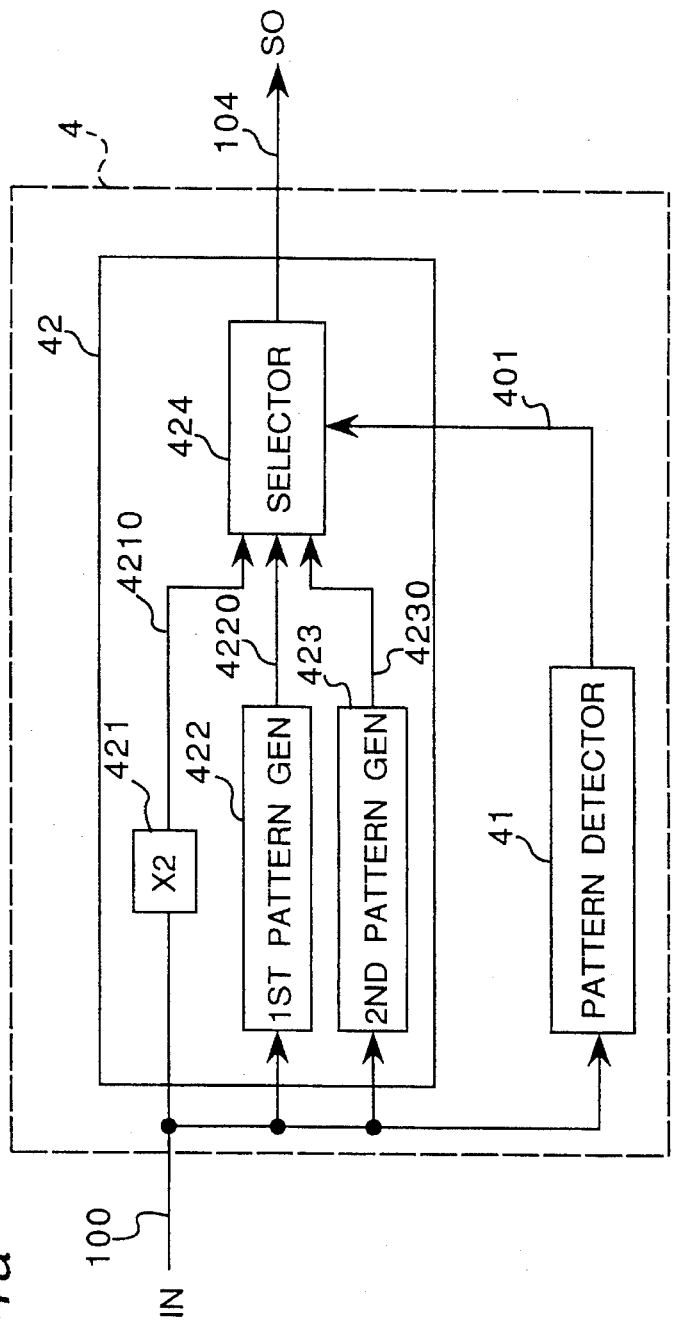
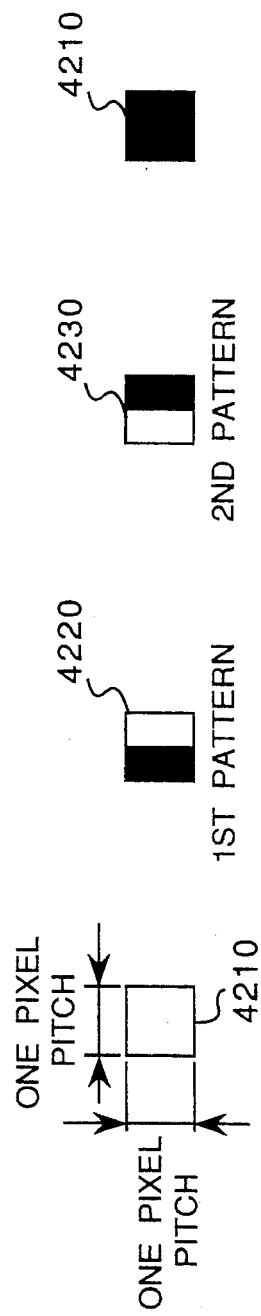
Fig. 14a  Fig. 14b  Fig. 14c  Fig. 14d  Fig. 14e

Fig. 17

COMMANDS

| COMMAND | FORMAT | FUNCTION | CODE |
|---|---|---|---|
| CHR | CHR,FS,DS,$X_s$,$Y_s$,$C_0$,$C_1$,...,$C_n$ | CHARACTER IMAGE | 1C 43 48 |
| GS | GS | GRAPHIC MODE SET | 1B 47 53 |
| GR | GR | GRAPHIC MODE RESET | 1B 47 52 |
| LI | LI,S,$X_s$,$Y_s$,$X_e$,$Y_e$ | LINE IMAGE | 1C 4C 49 |
| IS | IS | PICTORIAL MODE SET | 1B 49 53 |
| IR | IR | PICTORIAL MODE RESET | 1B 49 52 |
| IM | IM,DF,DS,$X_s$,$Y_s$,$X_w$,$D_0$,$D_1$,...$D_{DS-1}$ | PICTORIAL IMAGE | 1C 49 4D |

Fig. 19

| DF | SIGNIFICANCE |
|---|---|
| 00h | BIT MAP |
| 01h | MH COMPRESSION |
| 02h | MR COMPRESSION |
| 03h | MMR COMPRESSION |
| 04h | DCT COMPRESSION |
| 05h | CHARACTER IMAGE |
| 06h | GRAPHIC IMAGE |
| 07h | HALFTONE IMAGE |

IMAGE CONTROLLER

This application is a continuation of application Ser. No. 08/099,307 filed Jul. 29, 1993, now abandoned.

BACKGROUND OF THE INVENTION

1. Field of the Invention

The present invention relates to an image controller adapted to output an image of a mixture of pictorial plots, character plots and graphic plots through processing of the plots corresponding to each kind of plots.

2. Description of the Prior Art

In a conventional printer controller or the like, the image of a pictorial plot among a mixture of characters, graphics and pictorial plots has been converted to a pseudo halftone image through binarization according to the systematic dithering, and the image has been output as it has been stored in a binary image memory.

On the other hand, in order to enhance the image quality of a pictorial plot such as a photograph or the like, a multi-level image memory of three planes has been used to store the images of characters, graphics and pictorial plots, and the image data in the image memory has been output as it is to a printer. The image of the pictorial plot in this case is known to be a digital halftone image processed by the eight-level dither method (e.g., described in Vol. 1, No. 5, pp. 58–67 of "MACWORLD JAPAN").

In the above-described conventional technique, the images of different characteristics have been processed in the same fashion. In other words, although the images of the characters and graphics are binary, the images of the pictorial plots are represented in the multi-level halftone expression. Therefore, when an image of a mixture of these kinds of plots is stored by a binary image memory, the portion of the pictorial plots results in a harsh image and the quality of the total image is greatly worsened.

With much importance given to the pictorial plots, if a multi-level image memory constituted of three planes and capable of expressing in eight-level by one pixel is used to store the image of the mixed plots, the above drawback that the portion of the pictorial plots is harsh is improved, but the storage capacity is required to be increased.

SUMMARY OF THE INVENTION

The object of the present invention is therefore to provide a superior image controller which can process each of character plots, graphic plots and pictorial plots with high quality with use of a low-capacity image memory.

In order to accomplish the above object of the present invention, the image controller is constituted as follows.

In a first arrangement of the present invention, the image controller is provided with a memory means for storing at least one or more images of character plots, pictorial plots and graphic plots, a control means for plotting at least one or more of the character plots, pictorial plots and graphic plots to the memory means in accordance with the plotting data, a halftone estimating means for converting an N-level pictorial image to an M-level image (N<M), and a selecting means for selecting the image stored in the memory means for an area of the character plots or graphic plots, or the output of the halftone estimating means for an area of the pictorial plots in accordance with an area signal from the control means.

According to a second arrangement of the present invention, the image controller is provided with a memory means for storing at least one or more images of character plots, pictorial plots and graphic plots, a control means for plotting at least one or more of the character plots, pictorial plots and graphic plots to the memory means in accordance with the plotting data, an edge smoothing means for smoothing edges of the character plots or graphic plots, a halftone estimating means for converting an N-level pictorial image to an M-level image (N<M), and a selecting means for selecting the output of the edge smoothing means for an area of the character plots or graphic plots, or the output of the halftone estimating means for an area of the pictorial plots in accordance with an area signal from the control means.

In a third arrangement of the present invention, the image controller is provided with a memory means for storing a bit map image, a second control means for extracting a character image area, a graphic image area and a halftone pictorial image area from the image data among the character image area, graphic image area or halftone pictorial image area stored in the memory means, and controlling a select signal corresponding to the extracted separating area, a halftone estimating means for converting an N-level image processed to the halftone pictorial image to an M-level image (N<M), and a selecting means for selecting the image stored in the memory means for the character image area or graphic image area, and the output of the halftone estimating means for the halftone pictorial image area in accordance with the select signal of the second control means.

In a fourth arrangement of the present invention, the image controller is provided with a memory means for storing a bit map image, a second control means for extracting a separating area between a character image area or a graphic image area and a halftone pictorial image area from the image data among the character image area, graphic image area or halftone pictorial image area stored in the memory means, and controlling a select signal corresponding to the extracted separating area, an edge smoothing means for smoothing edges of character or graphic images, a halftone estimating means for converting an N-level image processed to the halftone pictorial image to an M-level image (N<M), and a selecting means for selecting the output of the edge smoothing means for the character or graphic image area and the output of the halftone estimating means for the halftone pictorial image area in accordance with the select signal of the second control means.

According to the first and third arrangements, when the character, graphic, pictorial images stored in the memory means are output to an output means, the selecting means selects the image data of the memory means for the character and graphic image areas and the image data output from the halftone estimating means for the pictorial image area in accordance with the select signal from the control means or second control means. Since the N-level image from the memory means is estimated and restored to the M-level image by the halftone estimating means, the memory capacity of the memory means is prevented from being increased, and a high quality image is obtained.

Further, in the second and fourth arrangements, when the character, graphic, pictorial images stored in the memory means are output to an output means, the selecting means selects the image data of the edge smoothing means for the character and graphic image areas, and the image data output from the halftone estimating means for the pictorial image area in accordance with the select signal of the control means or second control means. The edge smoothing means executes a treatment to make edges of the character and graphic images from the memory means smooth, and therefore, even a low-resolution output means can obtain a high quality image. Moreover, since the halftone estimating means estimates and restores the N-level image from the memory means to the M-level image (N<M), the increase of the memory capacity of the memory means is restricted, while a high quality image is obtained.

Accordingly, the image controller of the present invention provides a high quality output corresponding to each kind of the character plots, graphic plots and halftone pictorial plots even with a low-resolution image memory.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 14a is a block diagram of an edge smoothing circuit;

FIGS. 14b, 14c, 14d and 14e shown various pixel patterns;

FIG. 17 is a table showing various commands produced from a computer;

FIG. 19 is a table showing various identifiers DF of a command IM;

DETAILED DESCRIPTION OF THE PREFERRED EMBODIMENTS

An image controller according to a first embodiment of the present invention will be first described hereinbelow with reference to the accompanying drawings.

Figure 1:
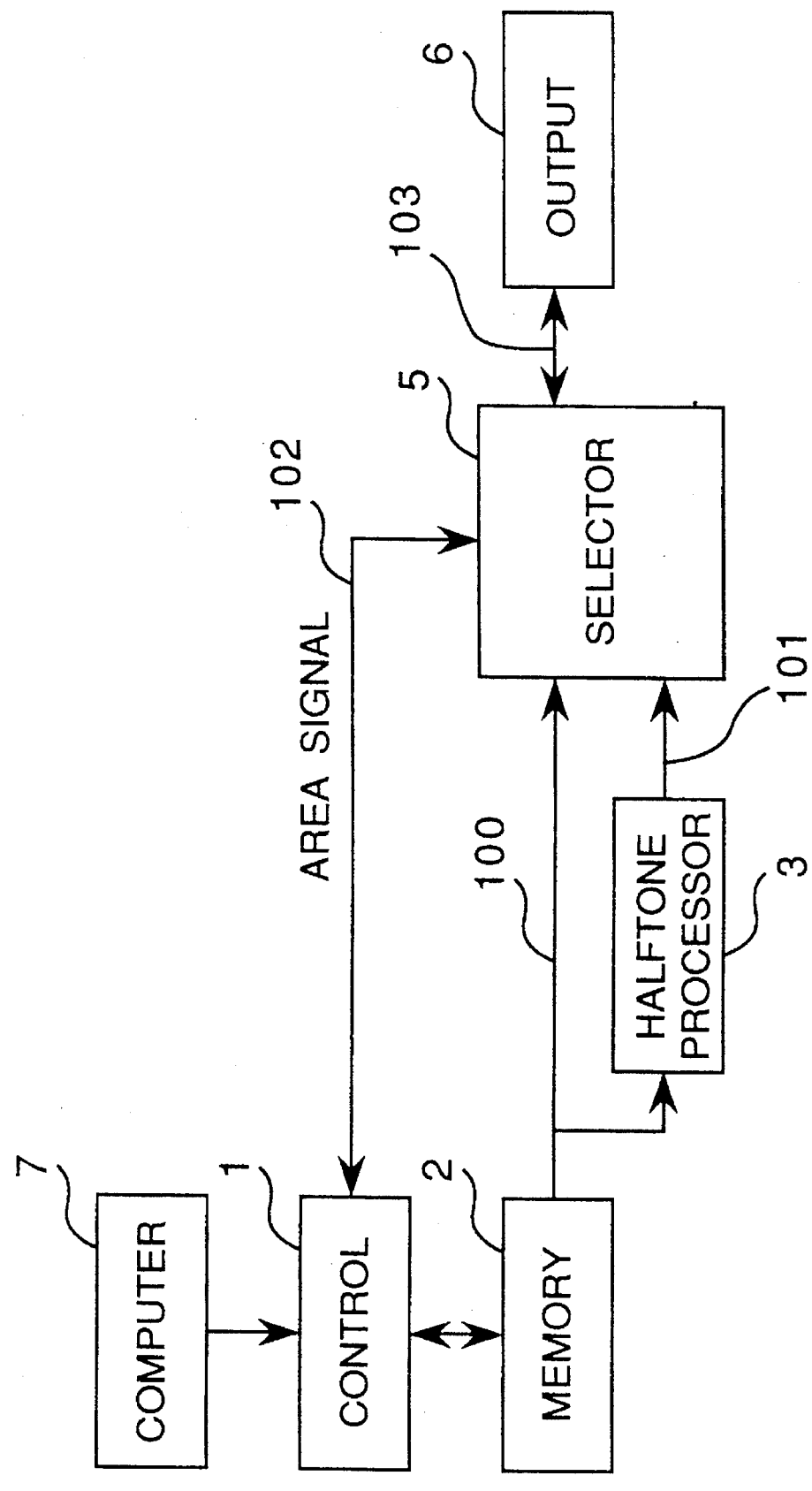
FIG. 1 is a diagram showing the basic structure of an image controller according to a first embodiment of the present invention.

FIG. 1 indicates the basic structure of an image controller of the first embodiment of the present invention.

In FIG. 1, a computer 7 outputs a plotting data to a control 1. The control 1 analyzes the content in the plotting data, performs area setting, pictorial plotting, development of a character font, processing of graphics in accordance with the analyzing result, and stores the plotting image data in an area of a memory 2 corresponding to the analyzing content. Thus, the data stored in memory 2 is a bit map data. The plotting image data stored in the memory 2 is output to a selector 5 and a halftone processor 3. The selector 5 selects either one of an output signal 100 of the memory 2 and an output signal 101 of the halftone processor 3 in response to an area signal 102 from the control 1. As a result, a select signal 103 is output to an output 6 from the selector 5. The output 6 can be a printer, a display device, etc. The description herein below is directed to a case in which the output 6 is a printer.

The operation of the image controller in the above-described structure will be schematically described below with reference to FIGS. 1 and 3.

Figure 3:
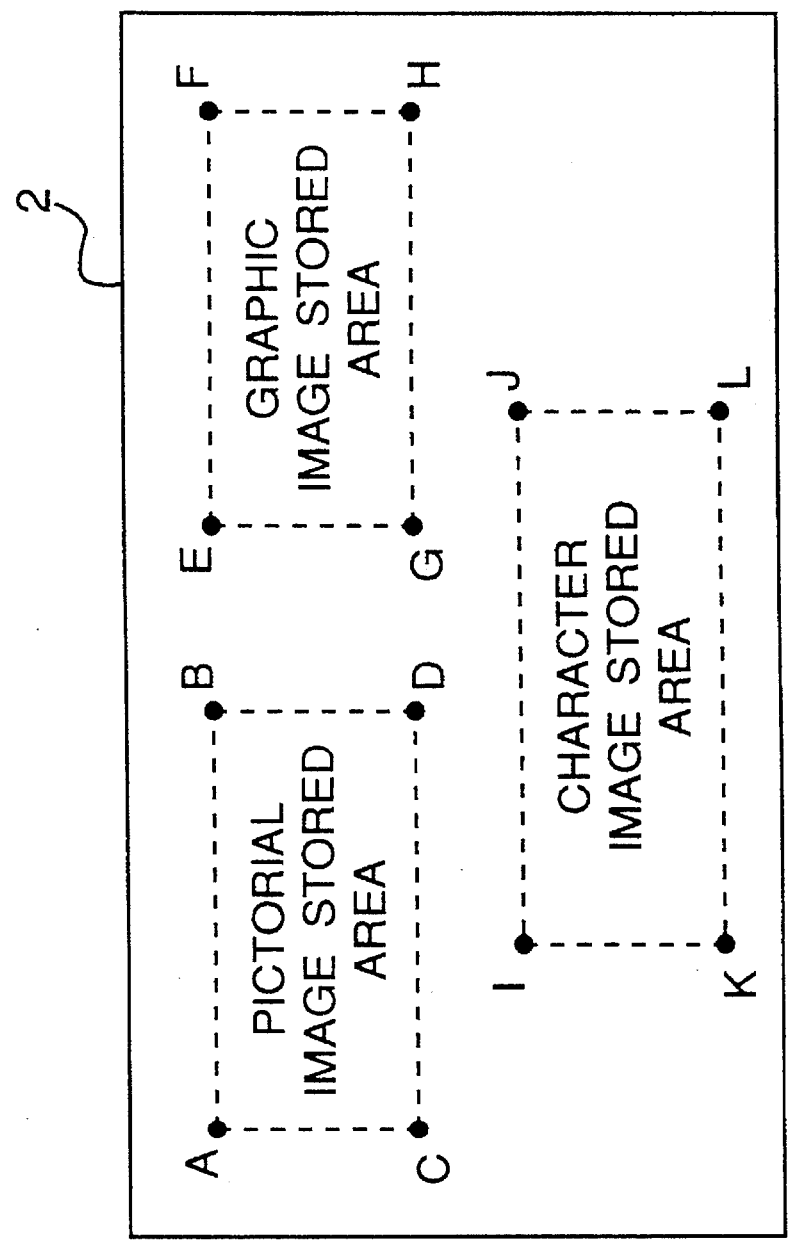
FIG. 3 is a diagram showing the plotting areas for storing different image data in a memory.

As shown in FIG. 3, according to one example, it is assumed that in memory 2, three different types of image data are stored: a pictorial image such as a photograph or the like is stored at area ABCD; a graphic image such as a graph with lines is stored at an area EFGH; and a character image such as a written article is stored at area IJKL. In the print out sheet by the output printer 6, it is preferable to have the pictorial image expressed with halftone printing and graphic image and character image with black-and-white printing, i.e., without halftone.

The control 1 sends the area signal 102 corresponding to the area ABCD, EFGH or IJKL of the images stored in the memory 2 to the selector 5. The selector 5 selects the output signal 101 of the halftone processor 3 while reading the area ABCD, and the output signal 100 of the memory 2 while reading the areas EFGH and IJKL.

Now, one embodiment will be discussed wherein an N-level image data (an image data with each pixel expressed by N level gradation) is stored in the memory 2, the output printer 6 is able to express M-level image output (a print out with each pixel expressed by M level gradation), and the halftone processor 3 converts the N-level image to the M-level image (N<M).

When the selector 5 selects the output signal 100, the N-level image data is normalized to an M-level image data for every one pixel, and the output signal 103 is generated. For instance, supposing that N=2 and M=17, and the output signal 100 is represented by P while the output signal 103 is represented by R, the data is converted so that R=16×P. Generally, R is obtained by an equation R=((M−1)/(N−1))× P. In other words, when the selector 5 selects the output signal 100, the binary image data in which black is expressed by "1" and white is expressed by "0" for each pixel is normalized to 17-level image data in which black is expressed by "16" and white is expressed by "0".

On the other hand, when the selector 5 selects the output signal 101, provided that the signal 101 is Q and the signal 103 is R, the data is converted to hold R=Q.

When N=2 and M=17, the halftone processor 3 converts the binary image (2-level image) expressed by one bit per one pixel to a 17-level image expressed by five bits per one pixel.

When the number of gray levels is required to express 32 or more levels, but the output device 6 has a modulator only 17 levels per one pixel, it is necessary to turn the estimating number of M-level to 32 levels or more and further to normalize to 17-level image data (M>17). In such case as above, the tone of the output of the halftone processor 3 is estimated, for example, by five bits per one pixel, and then the image data is further normalized according to the multi-level dithering, multi-level error-diffusion method or the like, thereby to output a 17-level image data processed through a digital halftone process. The method will be described later.

According to the first embodiment of the present invention, when the character images, graphic images and pictorial images stored in the memory 2 are read out and sent to the output 6, the selector 5 is, following the area signal 102 of the control 1, able to select the image data of the memory 2 for the character plotting area and the graphic plotting area and the image data output from the halftone processor 3 for the pictorial plotting area.

Since the halftone processor 3 converts the binary image from the memory 2 to the 17-level image, the capacity of the memory 2 is prevented from being increased, and a halftone image of a pictorial plot with good quality is ensured.

In the above first embodiment, the binary image expressed by one bit per one pixel is stored in the memory 2, but the selector 5 generates a 17-level image expressed by five bits per one pixel. Therefore, in comparison with the case where the image is stored by five bits per one pixel in the memory 2, the capacity of the memory 2 can be reduced to ⅕. Moreover, the image quality is improved as compared with that of the binary image. Before describing the details of the first embodiment, a basic structure of the second embodiment will be described first.

Figure 2:
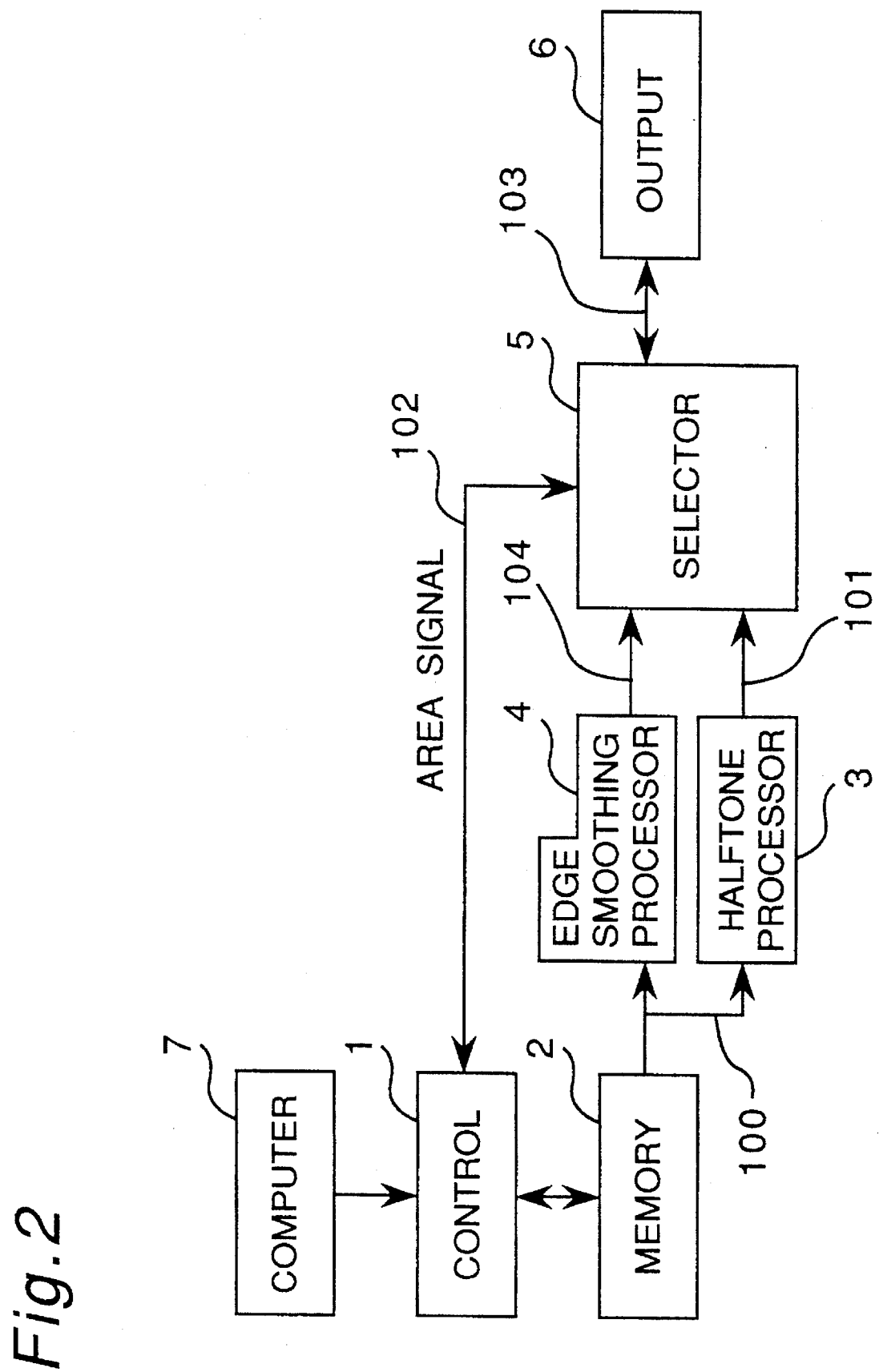
FIG. 2 is a diagram showing the basic structure of an image controller according to a second embodiment of the present invention.

FIG. 2 is a block diagram of the basic structure of an image controller according to the second embodiment of the present invention. The second embodiment differs from the first embodiment in the employment of an edge smoothing processor 4 inserted between the memory 2 and the selector 5.

Referring to FIG. 2, a computer 7 outputs a plotting data to a control 1. The control 1 in turn analyzes the content of the plotting data and performs area setting, pictorial plotting, development of a character font and graphic plotting according to the analyzing result, with storing a plotting image data to an area of a memory 2 corresponding to the analyzing content. The plotting image data in the memory 2 is output to an edge smoothing processor 4 and a halftone processor 3. A selector 5 selects an output signal 104 of the edge smoothing processor 4 or an output signal 101 of the halftone processor 3 in accordance with an area signal from the control 1, and outputs a select signal 103 to an output 6. The output 6 is, for example, a printer, a display device or the like.

The operation of the image controller constituted as above will be briefly discussed with reference to FIGS. 2 and 3. The details will be given later.

FIG. 3 indicates an example of the plotting areas of the image data stored in the memory 2. An area ABCD is an area to store the pictorial images such as photographs, etc., an area EFGH is an area where the graphic images are stored, and an area IJKL is to store character images.

The control 1 feeds the area signal 102 corresponding to the area ABCD, EFGH or IJKL in the memory 2 to the selector 5. Upon receipt of the area signal 102, the selector 5 selects the output signal 101 of the halftone processor 3 for the area ABCD where the pictorial images are stored, or the output signal 104 of the edge smoothing processor 4 for the areas EFGH and IJKL.

When the second embodiment is such that the memory 2 stores an N-level image data for every one pixel, the output 6 outputs the data in M-level image representation, the halftone processor 3 converts the N-level image to an M-level image (N<M), and the edge smoothing processor 4 converts the N-level image to an L-level image (N<L), the following operation will be carried out.

If the selector 5 selects the output signal 104, the L-level image data is normalized to an M-level image data for every one pixel, in a manner similar to that described above, in accordance with an image signal in the output signal 104 and, the M-level image data is output. By way of example, when N=2, M=17 and L=3, and the L-level image data and M-level image data are represented respectively by P and R, R=8×P is satisfied. Here, R is generally obtained from an equation R=((M−1)/(L−1))×P.

Meanwhile, when the selector 5 selects the output signal 101, the data is converted so that an image signal Q in the signal 101 and an image signal R in the signal 103 satisfy R=Q.

When N=2 and M=17, the halftone processor 3 converts the binary image (2-level image) expressed by one bit per one pixel to a 17-level image expressed by five bits per one pixel.

If the number of gray levels is required to express 32 or more levels, but the output device 6 has a modulator only 17 levels per one pixel, it is necessary to turn the estimating number of M-level to 32 levels or more and further to normalize to 17-level image data (M>17). In this case, the output of the halftone processor 3 is converted, e.g., by five bits per pixel, and the image data is normalized further by the multi-level dithering, multi-level error-diffusion method or the like manner, whereby a 17-level image data subjected to a digital halftone process is generated. The method of this case will be described later.

As described above, when the character images, graphic images and pictorial images are to be output to the output 6 from the memory 2, the selector 5 can select the image data of the edge smoothing processor 4 for the character and graphic areas, and the output image data from the halftone processor 3 for the pictorial area.

The edge smoothing processor 4 executes smoothing of edges of the character images and graphic images from the memory 2 by using the known RET technique of HP, namely, technique disclosed in U.S. Pat. No. 4,847,641, which is herein incorporated by reference. Therefore, even the output 6 of low resolution ensures a high quality image.

Moreover, since the halftone processor 3 converts the N-level image from the memory 2 to the M-level image (N<M), the increase of the capacity of the memory 2 can be suppressed and a high quality halftone pictorial image can be obtained.

In the foregoing second embodiment, the memory 2 stores the binary image of one bit per one pixel and the selector 5 outputs the multi-level, such as 17-level, image of five bits per one pixel. Accordingly, the capacity of the memory 2 can be reduced to ⅕ as compared with the case where the image is stored by five bits per one pixel. The image quality is improved further than that of the binary image.

While the basic structure and fundamental operation of the image controller in the first and second embodiments of the present invention are thus made clear hereinabove, the following description will be given to more fully describe the invention.

Figure 4:
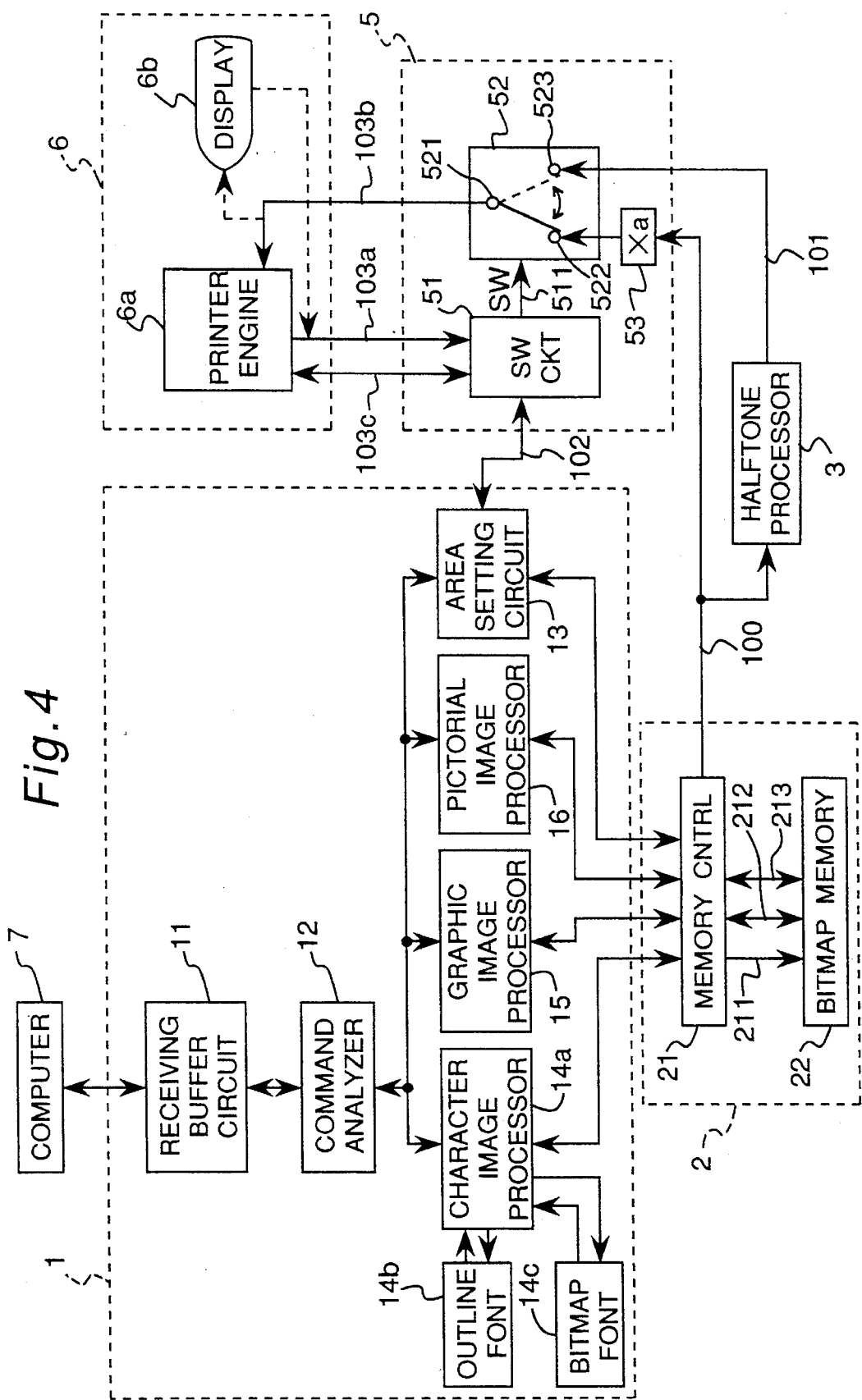
FIG. 4 is a block diagram of the image controller of the first embodiment.

FIG. 4 is a block diagram of the image controller of the first embodiment.

In FIG. 4, the computer 7 generates a plotting data to the controlling circuit 1. The controlling circuit 1 temporarily stores the plotting data in a receiving buffer circuit 11. The content is analyzed (decoded) by a command analyzer 12, and a process command is generated in accordance with the analyzed result to an area setting circuit 13, a pictorial image processor 16, a character image processor 14a and a graphic image processor 15. In the case where the characters and graphics are developed to a bit map by the raster pattern inside the computer 7, it is not necessary to provide the character image processor 14a and graphic image processor 15. As will be described in detail later in connection with FIGS. 17–21, the command analyzer 12 provides to the area setting circuit 13 commands related to data length for plotting the halftone pictorial image and the starting bit position expressed by a coordinates within a bit map, and also provides a bit map data to the pictorial image processor 16.

In response to the command from the circuit 12, the character image processor 14a drives an outline font developing circuit 14b to develop an outline font and also drives a bit map font developing circuit 14c to develop a bit map font by using a ROM memory or the like. The processing result from each circuit 14b, 14c is returned to the character image processor 14a, thereby to produce a character plotting data.

The graphic image processor 15 generates a graphic image data from the designated vector data.

In the pictorial image processor 16, if the input halftone image data is a compressed data, the data is expanded. The K-level image data is further converted to an N-level image data (K>N) by the digital halftone process, whereby a halftone image of the pictorial image is generated.

The pictorial image processor 16 is capable of processing the input data without deteriorating the same even if the data includes binary character data and binary graphic data.

Figure 12:
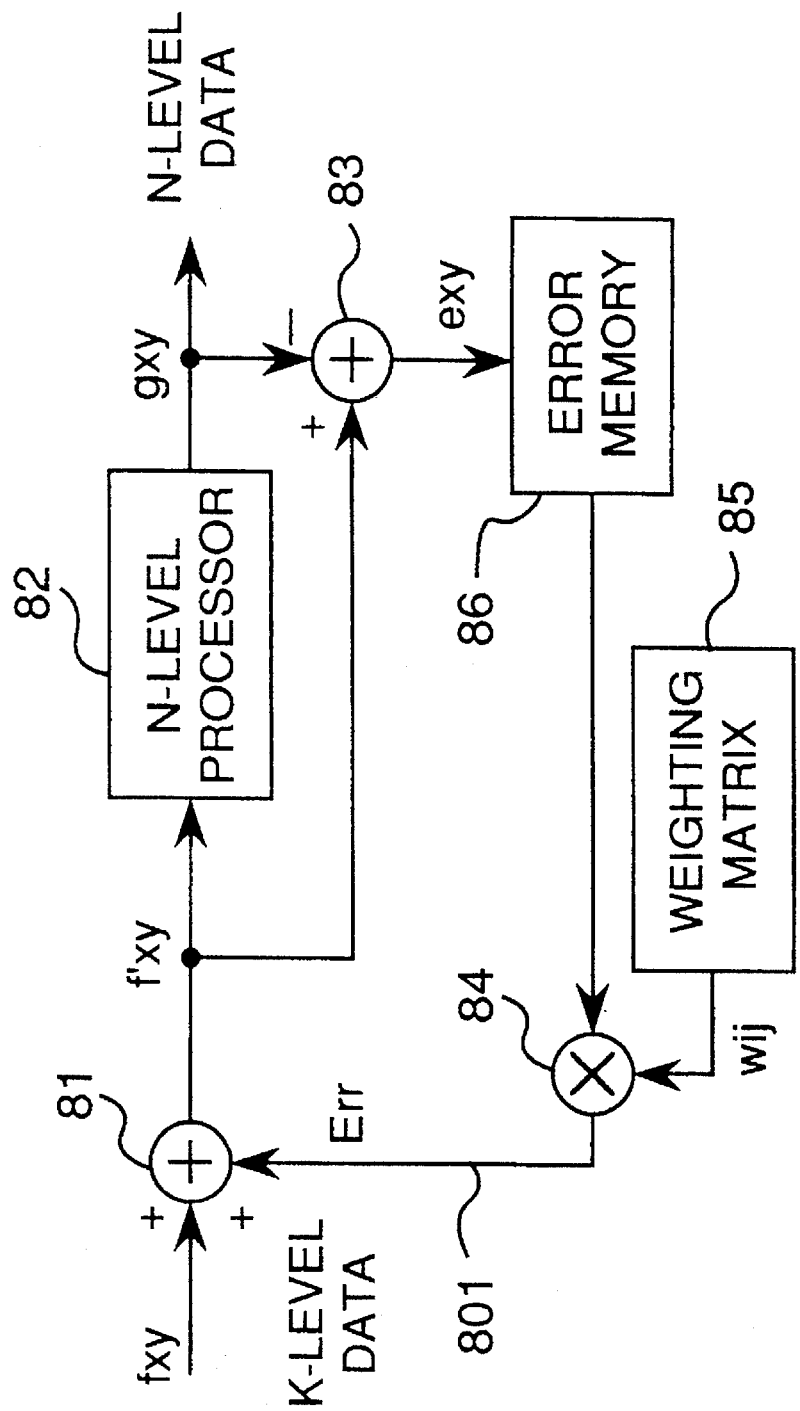
FIG. 12 is circuit diagram of converting a K-level image to an N-level image (K>N)

A example of a circuit for converting from the K-level image to the N-level image (K>N) is shown in FIG. 12. The K-level image data is converted to the N-level image data by the error-diffusion method in FIG. 12.

In FIG. 12, the K-level image data fxy is added to an integrating error value Err in the periphery of a target pixel by an adder 81. The adder 81 generates an output f'xy. This f'xy is quantized to N levels through comparison with a plurality of threshold values presented in a N-level processor 82, which then produces an output gxy. An adder 83 operates exy=f'xy-gxy and the quantizing error exy is distributed in the periphery of the target pixel by a weighting factor and stored in an error memory 86. An adder 84 multiplies an error value e distributed in the periphery of the target pixel by a weighting factor Wij of a weight matrix 85, outputting the integrating error value Err. A signal 801 represents the integrating error value Err=Σe(x+i,y+j)×Wij. For instance, when N=2, gxy is a binary output, i.e., 0 and 1, and the K-level image data is thus normalized to N-level image data.

At the plotting time by the pictorial image processor 16, if the K-level pictorial data from the computer 7 is converted to the N-level pictorial data gxy in the normalizing process to be used as an input image of the halftone processor 3, it becomes possible to avoid the influences of the systematic dithering matrix, e.g., block distortion and the like brought about when the N-level image data is estimated and restored according to the systematic dithering. As the number of necessary levels of gray is increased in the N-level image obtained from the K-level image data by the systematic dithering, the matrix size of the systematic dithering is enlarged, resulting in the deterioration of the image quality of the outline portion in grey (the image quality is greatly deteriorated particularly in the binarizing process). On the other hand, if the matrix size is reduced, the number of gray levels that can be represented decreases, and a false gray-scale contour then shows up in the halftone image. Therefore, when the halftone is estimated in the systematic dithering, the estimating error of the estimated N-level image data from the K-level image data becomes disadvantageously large.

Now that the N-level image data gxy formed by the error-diffusion method in FIG. 12 is input to the halftone processor 3, it is possible to estimate and restore the data from the image data the density of which is preserved, while satisfying the resolution without generating a pseudo outline and good gradation properties, with less deterioration of the edge portion. Accordingly, a high quality image is obtained. Although the error-diffusion method is employed in the embodiment, a high quality image is obtained similarly by the other method, for example, method of least mean-square error estimation, etc. except for the independently-determining type dithering.

Referring back to FIG. 4, in the memory circuit 2, control signals and data from each of the processing circuits 13, 14a, 15 and 16 are received by a memory controller 21, and the memory controller 21 stores the image data through an address signal line 211, a memory control signal line 212 and a data line 213 in a designated area of an image memory 22 which stores the image data in a bit map format. The image data stored in the memory 22 is sequentially read out by memory controller 21 in raster pattern. The image data read out from the memory circuit 2 is supplied to the selecting circuit 5 directly and also through the halftone processor 3. Both an area setting data output from the area setting circuit 13 in the control circuit 1 and a pixel clock signal are input to a switching circuit 51 in the selecting circuit 5 via the signal line 102. As a result, a switching signal 511 (SW) is output to a switch 52 in accordance with the setting, thereby selecting the output signal 100 of the memory circuit 2 or the output signal 101 of the halftone processor 3, and providing a select signal 103b to the output device 6 such as a printer engine 6a or a display device 6b, etc.

The image controller of the first embodiment will be further explained with reference to FIGS. 4 through 11.

Figure 5:
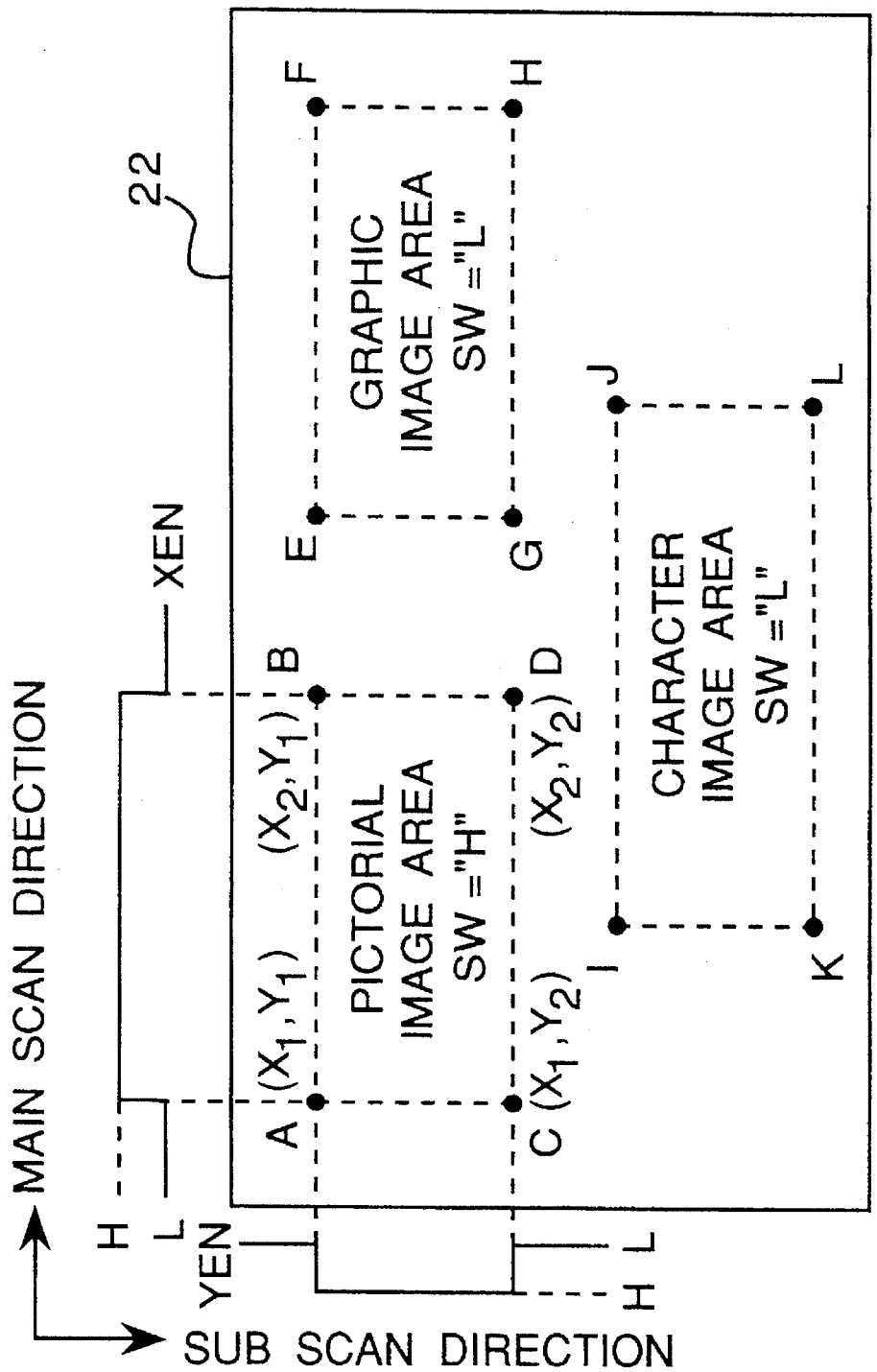
FIG. 5 is a diagram showing the plotting areas for storing different image data in a memory and also showing switching signal wave forms.

FIG. 5 shows an example of the plotting areas of the image data in the image memory 22 and the switching signal. More specifically, the area ABCD stores pictorial images such as photographs or the like, area EFGH stores graphic images, and area IJKL stores character images.

The command analyzer 12 of the control circuit 1 outputs the coordinate address data indicating areas ABCD, EFGH and IJKL, and supplies them to pictorial image processor 16, graphic image processor 15, and character image processor 14a, respectively. For example, the coordinate address data for area ABCD are (X1, Y1) representing the top left corner and (X2, Y2) representing the bottom right corner. The coordinate address data indicating areas ABCD, EFGH and IJKL are supplied also to the area setting circuit 13. Of these coordinate address data, the coordinate address data of the area ABCD for plotting the pictorial image are send and temporarily held in the switching circuit 51 of the selecting circuit 5 through the signal line 102. Thereafter, the printer engine 6a is activated through the signal line 102 and a control signal line 103c (in the case where the display device 6b is connected, no activation process is carried out because the display device 6b is a passive device).

The switching circuit 51 generates the switching signal 511 (SW) which is formed in consideration of the line synchronous signal 103a from the printer engine 6a, a TOP signal 517 (included in the signal line 103c) and a pixel clock signal 512 (included in the signal line 102).

When the signal 511(SW) is "L" (LOW level signal), the switch 52 connects an input terminal 522 with an output terminal 521. When the signal 511(SW) is "H" (HIGH level signal), the switch 52 connects an input terminal 523 with the output terminal 521. As will be described later, signal 511(SW) is "H" during the scanning in the area ABCD of FIG. 5 and "L" in the other areas. Thus, the output 101 of the halftone processor 3 is selected for printing the area ABCD, while the output 100 of the memory circuit 2 is selected for printing the areas EFGH and IJKL.

Meanwhile, an example when the N-level image data is stored in the image memory 22 for every pixel, the output device 6 is capable of outputting M-level image data, and the halftone processor 3 converts the N-level image to the M-level image (N<M) will be discussed below.

In the case where the switch 52 selects the output signal 100, the N-level image data is normalized to the M-level image data for every pixel in the normalizing circuit 53 when the data is input, and the output signal 103b is generated. Assuming that N=2, M=17 and the output signals 100 and 103b are denoted by P and R, respectively, the data is converted to hold R=16×P. Generally, R=axp P and a is obtained from an expression $a=((M-1)/(N-1))$.

When the switch 52 selects the output signal 101, the signal 101 represented by Q is made equal to the signal 103b, i.e., R.

The halftone processor 3 converts the 17-level image of five bits per one pixel from the binary image of one bit per one pixel when N=2 and M=17.

The operation of the switching circuit 51 will be described now.

Figure 6:
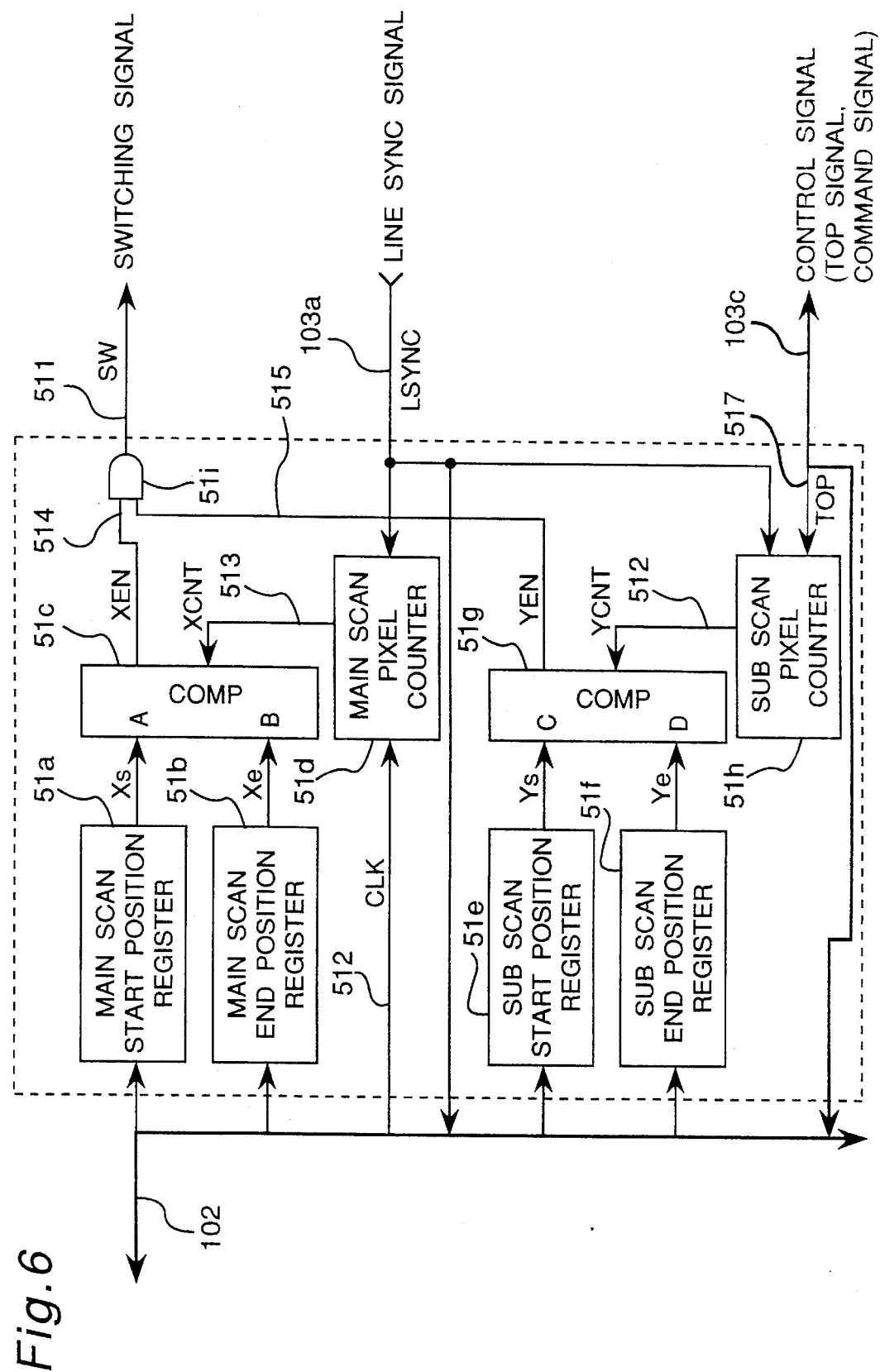
FIG. 6 is a block diagram of a switching circuit.
Figure 7:
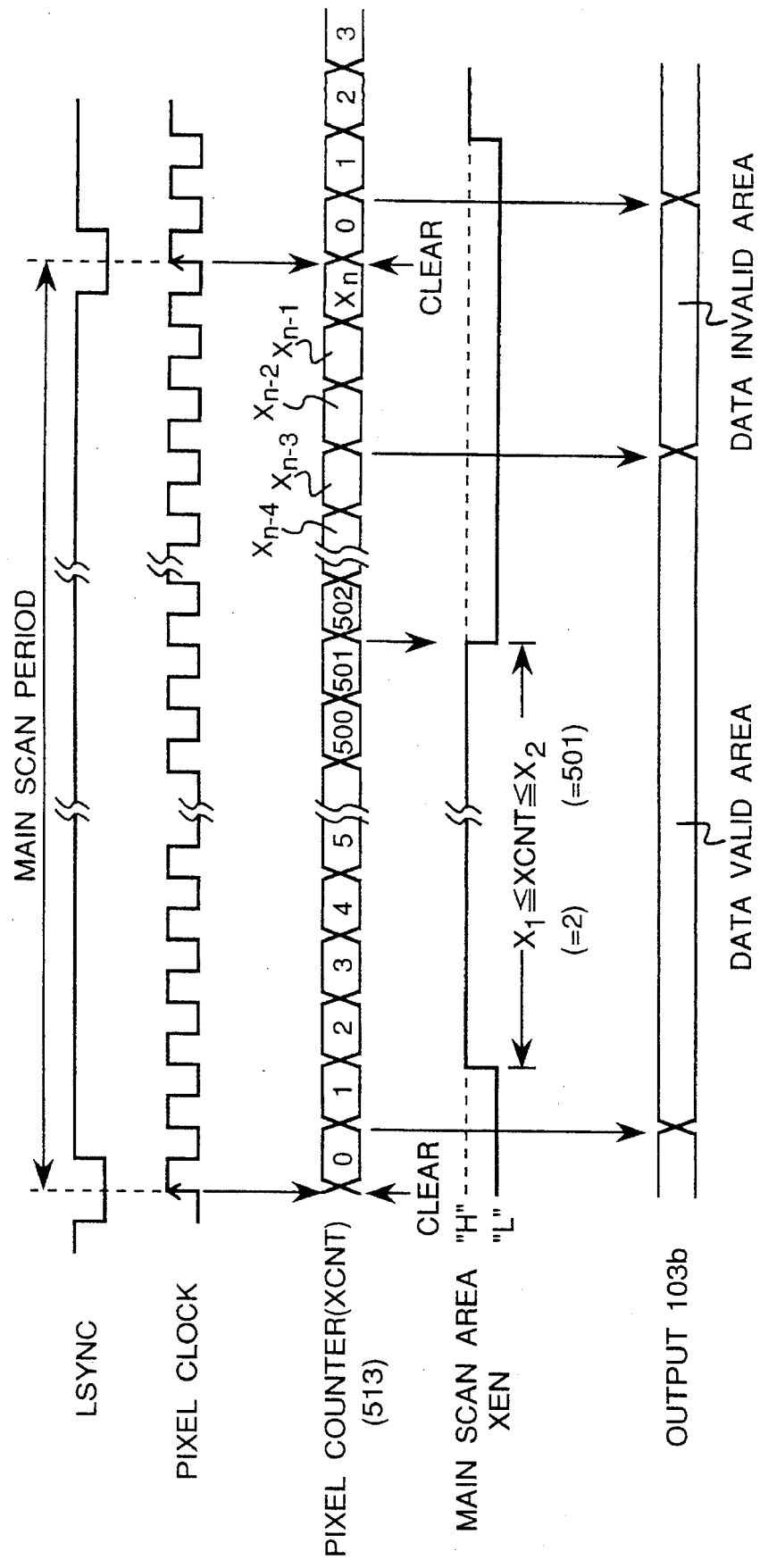
FIG. 7 is a time chart showing the operation of the switching circuit in the main scanning direction.
Figure 8:
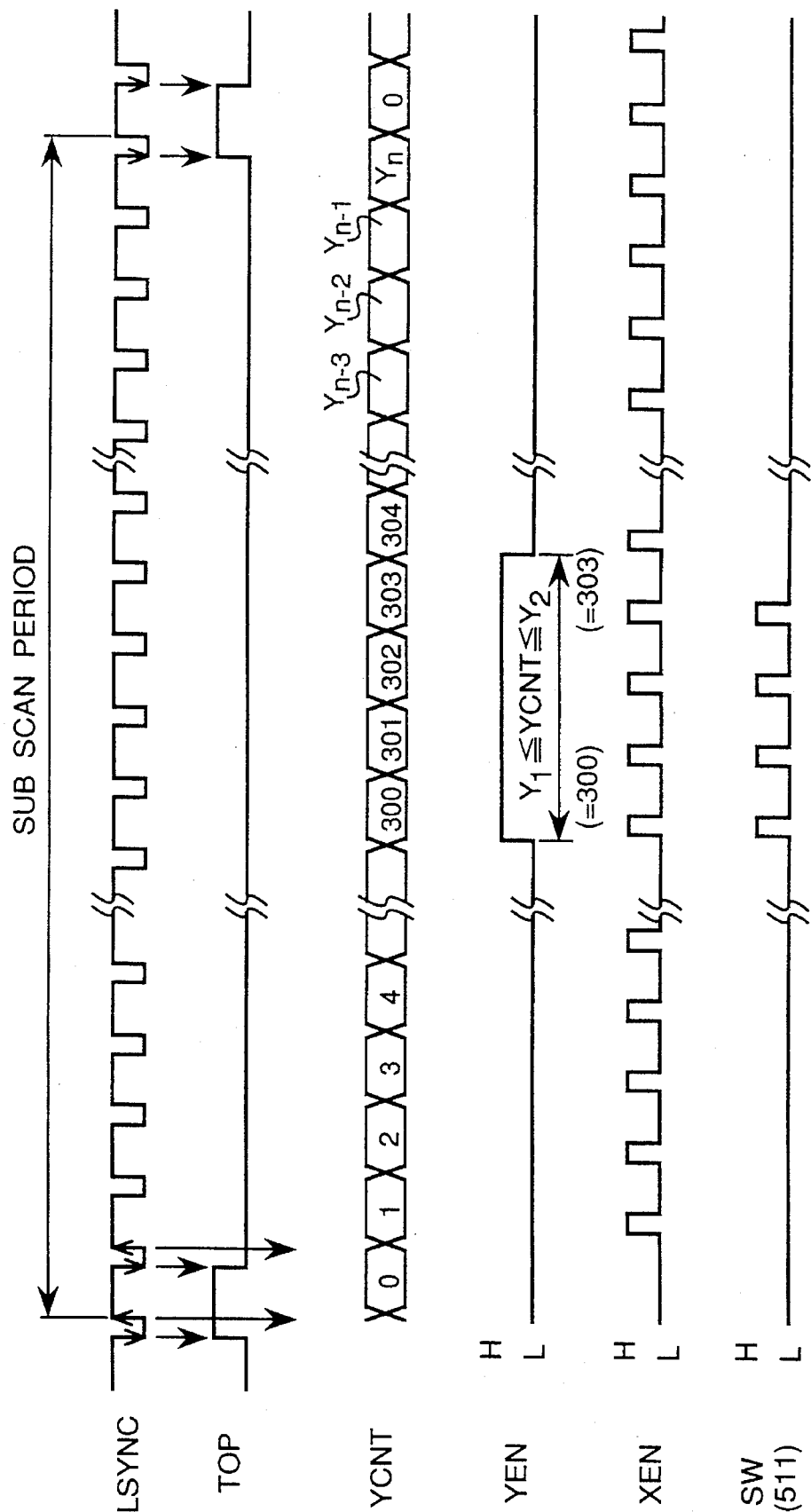
FIG. 8 is a time chart showing the operation of the switching circuit in the sub scanning direction.

Referring to FIG. 6, a detail of the switching circuit 51 is shown which includes registers 51a, 51b, 51e and 51f, comparators 51c and 51g, counters 51d and 51h and AND gate 51i. FIG. 7 is a timing chart showing the operation of the switching circuit 51 in the main (or horizontal) scanning direction of raster pattern and FIG. 8 is a timing chart showing the operation of the switching circuit 51 in the sub (or vertical) scanning direction.

The main scanning area start register 51a stores the left side coordinate address data Xs (in the above example xs=X1) of the pictorial image area ABCD, the main scanning area end register 51b stores the right side coordinate address data Xe (in the above example Xe=X2), the sub scanning area start register 51e stores the top side coordinate address data Ys (in the above example Ys=Y1), and the sub scanning area end register 51f stores the bottom side of the coordinate address data Ye (in the above example Ye=Y2).

While reading the data from bit map memory 22 by the pixel clock, the same pixel clock is applied to the pixel counter 51d which produces signal XCNT indicative of the current reading position in the main scanning direction. Similarly, the line sync signal is applied to the pixel counter 51h which produces signal YCNT indicative of the current reading position in the sub scanning direction.

The comparator 51c compares the current reading position in the main scanning direction and produces "H" when the current reading position is between the addresses (X1) and (X2) stored in registers 51a and 51b, and "L" in the remaining area. Similarly, comparator 51g compares the current reading position in the sub scanning direction and produces "H" when the current reading position is between the addresses (Y1) and (Y2) stored in registers 51e and 51f, and "L" in the remaining area.

Thus, as shown in FIG. 7, the comparator 51c produces "H" during X1≦XCNT≦X2 in the main scanning period of one line wherein XCNT is the current main scanning position signal along line 513. In the example shown in FIG. 7, X1=2 and X2=501. Also, as shown in FIG. 8, the comparator 51g produces "H" during Y1≦YCNT≦Y2 in the sub scanning period of one page (or one frame) wherein YCNT is the current sub scanning position signal along line 512. In the example shown in FIG. 7, Y1=300 and Y2=303.

The AND gate 51i receives signals from comparators 51c and 51g and produces "H" (switching signal 511(SW)) when both comparators 51c and 51g are producing "H", i.e., only when the current reading position is within the pictorial image area ABCD. Thus, switch 52 is turned to the output 101 of the halftone processor 3 when the pictorial image area ABCD in the bit map memory 22 is being read, and to the output 100 of the memory circuit 2 when the area outside the pictorial image area is being read.

If a plurality of halftone pictorial areas are present in the sub scanning direction, the area setting 2 circuit 13 updates the coordinate address data in the registers 51a, 51b, 51e and 51f in the middle of counting of the signals 103b during the invalid area Xn-2 to 0. The area setting circuit 13 detects an invalid area in the main scanning direction from the line synchronous signal 103a and the pixel clock from the memory controller 21, and detects the position address in the sub scanning direction from the TOP signal 517 and the line synchronous signal 103a.

Next, an example of the halftone processor 3 for converting the N-level image to the M-level image (N<M) will be described with reference to FIGS. 9 through 11.

Figure 9:
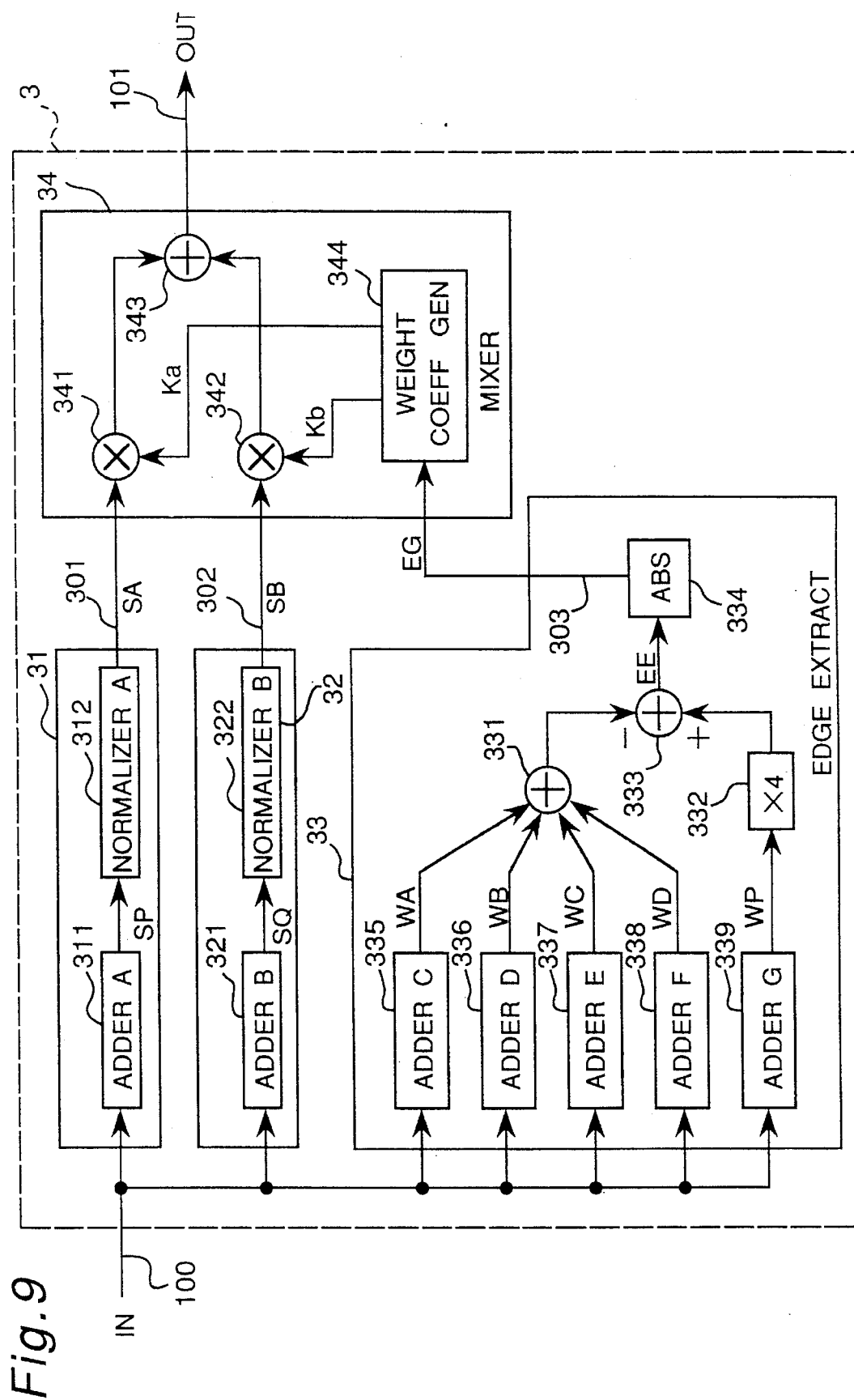
FIG. 9 is a block diagram of a halftone processor.
Figures 10A, 10B, 10C, 11:
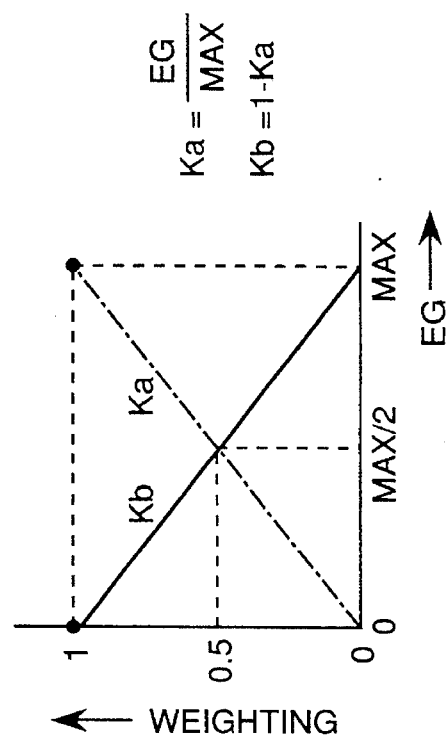
FIGS. 10a, 10b and 10c are illustrations of filters.
FIG. 11 is a graph showing a characteristics of a mixing circuit.

FIG. 9 is a block diagram of the halftone processor 3, FIGS. 10a, 10b and 10c explaining a filter and FIG. 11 is a mixing circuit 34 both provided in the halftone processor 3.

In FIG. 9, an estimating circuit 31 and an estimating circuit 32 estimate the tone from the peripheral pixels of a target pixel in response to the input signal 100. An edge extracting circuit 33 extracts edge components of the image data from the input signal 100. A signal 303 of the edge extracting circuit 33 becomes larger as the amount of the edge components is increased. A mixing circuit 34 mixes signals 301 and 302 of the estimating values in compliance with the signal 303 from the edge extracting circuit 33, then outputting the signal 101. Since the smoothing degree of the estimating value is controlled corresponding to the amount of the edge components in the outline portion of the image, both the smoothness and the resolution are satisfied, thus achieving a high quality image without noise.

The operation of the halftone processor 3 in the above-described structure will be discussed with reference to FIGS. 9 to 11.

The estimating circuit 31 consists of an adder circuit 311 and a normalizing circuit 312. The adder circuit 311 uses a filter 310 of the size, for example, 2×2 pixels shown in FIG. 10*a*. The adding value SP of the pixels in the size is calculated according to an expression (1) below in which P22 represents a target pixel;

$$SP = P22 + P23 + P32 + P33 \quad (1)$$

The estimating circuit 32 is constituted of an adder circuit 321 and a normalizing circuit 322. The adder circuit 321 uses a filter 320 of the size, e.g., 4×4 pixels as shown in FIG. 10*b*. The adding value SQ of the pixels in the size is operated in accordance with an expression (2) below, wherein P22 indicates a target pixel;

$$\begin{aligned} SQ = \; & P11 + P12 + P13 + P14 + \\ & P21 + P22 + P23 + P24 + \\ & P31 + P32 + P33 + P34 + \\ & P41 + P42 + P43 + P44 \end{aligned} \quad (2)$$

Since the smoothing degree of the estimating levels of gray that is obtained from an area of larger size, a signal 302(SB) from the estimating circuit 32 becomes larger than a signal 301(SA) of the estimating circuit 31.

Supposing, for example, that N=2 and M=17, when the binary image data of the signal 100 is scanned for every pixel, the adder circuit 311 obtains a value from 0 to 4 through addition, and the adder circuit 321 obtains a value from 0 to 16 through addition. The adding result SP is multiplied to four times the value in the normalizing circuit 312 to normalize the output of the estimating circuit 31 to the maximum 16, whereby the signal 301(SA) is output. The normalizing circuit 322 multiplies the adding result SQ one time to normalize the output of the estimating circuit 32 to the maximum 16 and generates the signal 302(SB).

The edge extracting circuit 33 adds the outputs from adder circuits 335–338 in an adder 331. At the same time, the output of an adder 339 is multiplied by an adder 332 to four times. The output of the adder 331 is subtracted from the output of the adder 332 by an adder-subtracter 333, and an absolute value EE is obtained in an absolute value circuit 334. As a result, a signal 303(EG) is output. The above operations will be expressed by the following expression (3) in which ABS(X) is an operation to obtain an absolute value X;

$$EE = ABS(4 \times WP - WA - WB - WC - WD) \quad (3)$$

Each of the adders 335–339 of the edge extracting circuit 33 uses a filter shown in FIG. 10*c*, more specifically, the adder 335 using a filter 3350, the adder 336 using a filter 3360, the adder 337 a filter 3370, the adder 338 a filter 3380 and the adder 339 a filter 3390, respectively. Each adder obtains the adding value of the pixels in the 2×2 size. When the adding outputs of the adders 335, 336, 337, and 339 are WA, WB, WC, WD and WP, the outputs will be calculated according to equations (4), (5), (6), (7) and (8), respectively wherein P22 is a target pixel;

$$WA = P11 + P12 + P21 + P22 \quad (4)$$

$$WB = P13 + P14 + P23 + P24 \quad (5)$$

$$WC = P31 + P32 + P41 + P42 \quad (6)$$

$$WD = P33 + P34 + P43 + P44 \quad (7)$$

$$WP = P22 + P23 + P32 + P33 \quad (8)$$

The mixing circuit 34 mixes the signals 301 and 302 in accordance with the signal 303(EG) of the edge extracting circuit 33. A weighting factor generating circuit 344 determines the mixing ratio from the signal 303 and outputs a factor Ka and a factor Kb. The signal 303 is so clipped as to have the maximum value MAX. For instance, the factor Ka is made equal to EG/MAX and the factor Kb is set to be 1-Ka. FIG. 11 is a graph of the mixing ratio. Ka=0.5 and Kb=0.5 are obtained where the signal 303 satisfies MAX/2. An adder 341 multiplies the signal 301 by the factor Ka and an adder 342 multiplies the signal 302 by the factor Kb. The multiplying results are added in an adder 343, whereby the signal 101 is output.

Representing the above operations in an expression, the signal 101 indicated by OUT will be obtained according to an expression (9) below in which SA is the signal 301, SB is the signal 302, EG is the signal 303, and the maximum value of the signal 303 is clipped to MAX;

$$OUT = [(1 - Ka) \times SB + Ka \times SA] \quad (9)$$

wherein Ka=EG/MAX. It is to be noted here that the degree of smoothness of the estimated image is larger by the signal SB than by the signal SA. [ ]of the expression (9) indicates a process to obtain an integer by the emission of decimal fractions.

Owing to the halftone processor 3 as above, the N-level image is prevented from being harsh and the resultant halftone image maintains the sharp outline. Consequently, the N-level image is estimated and restored to the M-level image (N<M) of high quality.

In the aforementioned embodiment, although the adder circuits 311 and 321 use the filters of the size 2×2 and 4×4, respectively, the size of the filter is not specified in the present invention. If the filter size is enlarged, the degree of smoothness of the estimating value is enhanced thereby to obtain a larger adding result. Therefore, the embodiment is applicable even when M becomes larger. Moreover, the number of the filters may be increased. In such case, the output of each filter is normalized and mixed in the similar manner by using the output of the filter with the largest adding result as a reference. It may also be carried out to select the normalized output signals 301 and 302, other than to use the mixing process.

A further detail of the halftone processor 3 is disclosed in my previous U.S. patent application Ser. No. 08/044,827 filed Apr. 8, 1993, now U.S. Pat. No. 5,454,052 and entitled "METHOD AND APPARATUS FOR CONVERTING HALFTONE IMAGES", the disclosure of which is herein incorporated by reference.

N is not limited to 2 as in the embodiment. If N is large, even a small filter can eliminate the harsh of the image data, and a large adding result is obtained.

Through the foregoing process, the harsh of the image data of the signal 100 is removed while the outline portion is preserved, so that the signal 101 results in high quality.

According to the first embodiment of the present invention, when the character image, graphic image and halftone pictorial image stored in the memory circuit 2 are to be output to the output device 6, the selecting circuit 5 selects the image data of the memory circuit 2 for the areas of the character image and graphic image, and the output image data of the halftone processor 3 for the area of the halftone pictorial image.

The halftone processor 3 converts, e.g., the binary image from the memory circuit 2 to a 17-level image, and therefore, the increase of the capacity of the memory circuit 2 is suppressed while the high quality halftone image is obtained.

In the first embodiment, the binary image of one bit per one pixel is stored in the memory circuit 2, which is output as a 17-level image of five bits per pixel from the selecting circuit 5. Therefore, as compared with the case where the image is stored by five bits per pixel in the memory circuit 2, ⅕ the memory capacity is enough. Moreover, the image quality is improved in comparison with that of the binary image.

Figure 13:
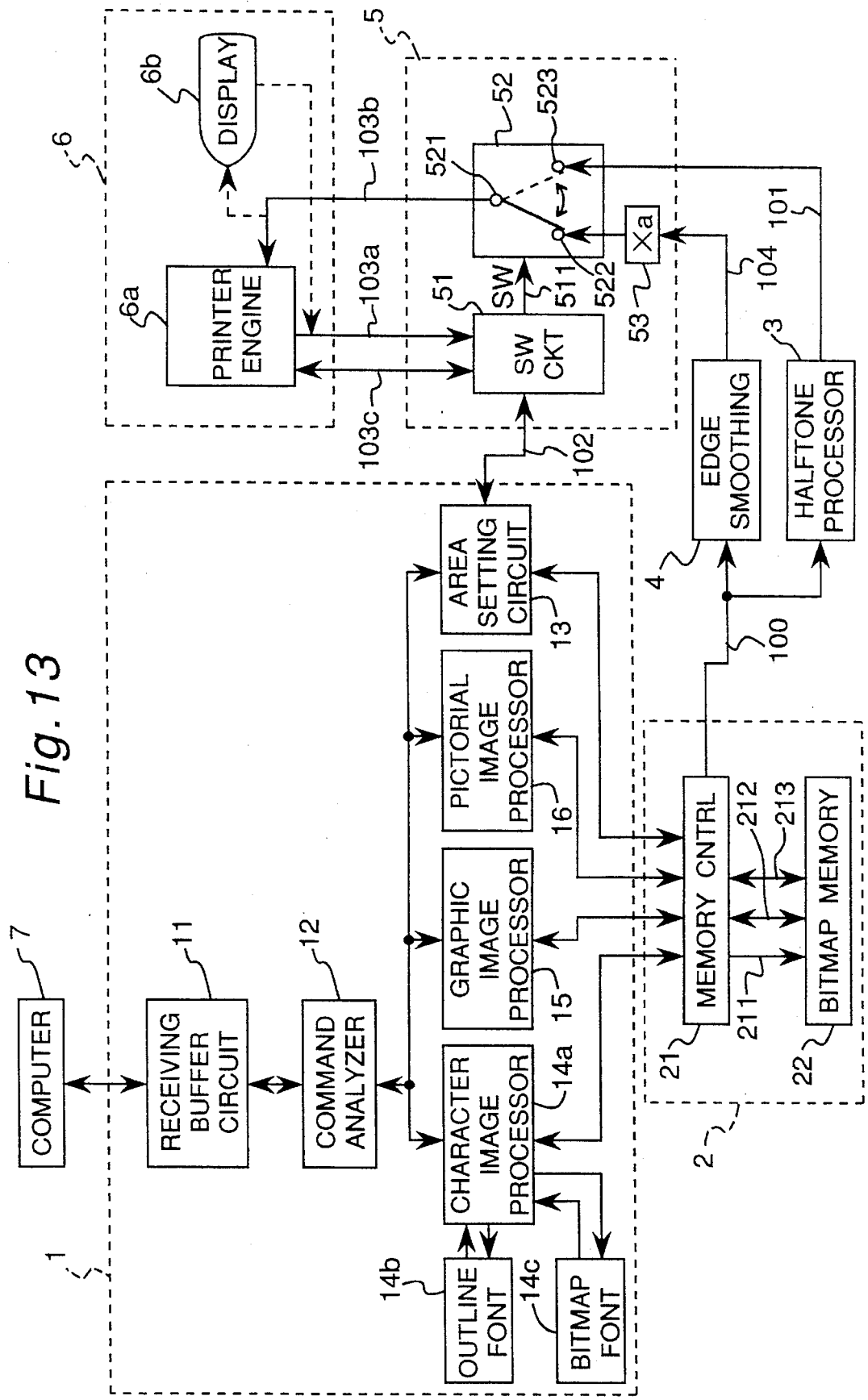
FIG. 13 is a block diagram of the image controller of the second embodiment.
Figure 15:
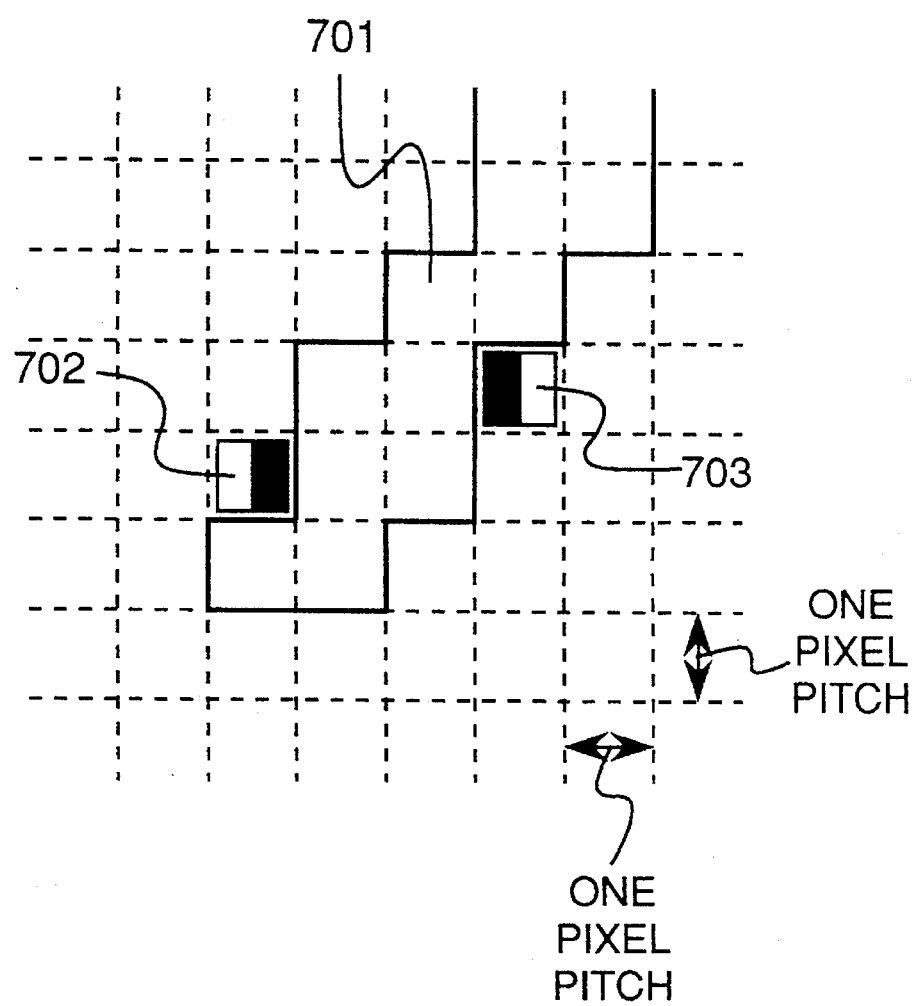
FIG. 15 is an explanatory diagram showing added pixels for smoothing the line edge.

Referring to FIG. 13, the image controller according to the second embodiment of the present invention is shown. The only difference from the first embodiment is that an edge smoothing circuit 4 is provided between the memory controller 21 and the terminal 522 of the switch 52. The computer 7, control circuit 1, memory circuit 2, halftone processor 3, selecting circuit 5 and output device 6 are the same as those described above in the first embodiment.

The edge smoothing circuit 4 will be described with reference to FIGS. 14a–14e and 15.

In FIG. 14a, a pattern detecting circuit 41 detects a character pattern and a graphic pattern from the input signal 100 of the character image, graphic image, etc., and outputs a signal 401. A pattern selecting circuit 42 selects, in accordance with the signal 401 of the pattern detecting circuit 41, an output of a first pattern generating circuit 422 or a second pattern generating circuit 423 or multiplier 421, and produces a selected signal 104.

For instance, the pattern selecting circuit 42 selects a signal 4230 at the pixel position of a pattern 702 (FIG. 15), and a signal 4220 at the pixel position of a pattern 703, thereby correcting the outline portion of a character or graphic pattern 701. Accordingly, the jagged area of the pattern 701 is changed smooth. The pattern 701 is an enlarged view of a partial area and may be a character or a graphic. The edge smoothing circuit 4 makes a pattern of oblique lines smooth in the above manner.

P of a pixel unit is set in the stage of design depending on the specification of the output device 6 to determine the size of a pattern to be generated. For example, if P=2, the generating pattern is selected by a half (½) of a pixel unit. The arrangement of ½ pixel is determined within one pixel based on the detection of the pattern 701. The pattern selecting circuit 42 selects the pattern in accordance with the arranging pattern, and outputs the signal 104. In the second embodiment, if ½ pixel of the image signal is corresponding to [1], the signal becomes a three-level image signal in three, namely, [0], [1] and [2] levels. A normalizing circuit 53 of the selecting circuit 5 normalizes the three-level image signal and outputs the same to the output device 6.

If the switch 51 selects the output signal 104, the L-level image data is converted to the M-level image data per one pixel in the normalizing circuit 53, and the output signal 103b is generated. When L=3 and M=17, the data is converted to satisfy R=8×P wherein P is the output signal 104 and R is the output signal 103b. In general, R=axP and a=((M−1)/(L−1)). Meanwhile, if the switch 51 selects the signal 101, R=Q is held when Q is the output signal 101 and R is the signal 103b. It is needless to say that the normalizing process may be conducted in the pattern selecting circuit 42.

The edge smoothing circuit 4 executes the smoothing process of edges of the character and graphic images by using, for example, the known RET method by HP disclosed in U.S. Pat. No. 4,847,641. Therefore, even when the output device 6 has a low resolution, a high quality output is ensured.

When the signal 511(SW) is "L", the switch 52 connects the input terminal 522 with the output terminal 521. If the signal 511(SW) is "H", the input terminal 523 is connected to the output terminal 521. Therefore, by setting the signal 511(SW) to "H" in the pictorial area ABCD and to "L" in the other areas, the output 101 of the halftone processor 3 is selected for the area ABCD, and the output 104 of the edge smoothing circuit 4 is selected for the other areas, that is, areas EFGH and IJKL.

As described hereinabove, in the second embodiment of the present invention, when the character image, graphic image and halftone pictorial image stored in the memory circuit 2 are to be output to the output device 6, the selecting circuit 5 selects the image data from the edge smoothing circuit 4 for the plotting areas of characters and graphics in accordance with the area signal 102 of the control circuit 1, and the image data output from the halftone processor 3 for the area of the halftone pictorial image.

The halftone processor 3 restores the binary image from the memory circuit 2 to the 17-level image, thus restricting the increase of the capacity of the memory circuit 2 and achieving a high quality halftone pictorial image.

The edge smoothing circuit 4 smooths the edges of the character and graphic images, and therefore even the output device 6 of low resolution can obtain a high quality output.

In the second embodiment, the binary image of one bit per pixel is stored in the memory circuit 2, and output as the 17-level image of five bits per pixel by the selecting circuit 5. Therefore, the memory capacity is reduced to ⅕ in comparison with the case where the image is stored by five bits per pixel in the memory circuit 2. Moreover, the image quality is improved much more than that of the binary image. Accordingly, a high quality image signal can be obtained in any of the pictorial area ABCD, graphic area EFGH and character area IJKL.

Figure 16:
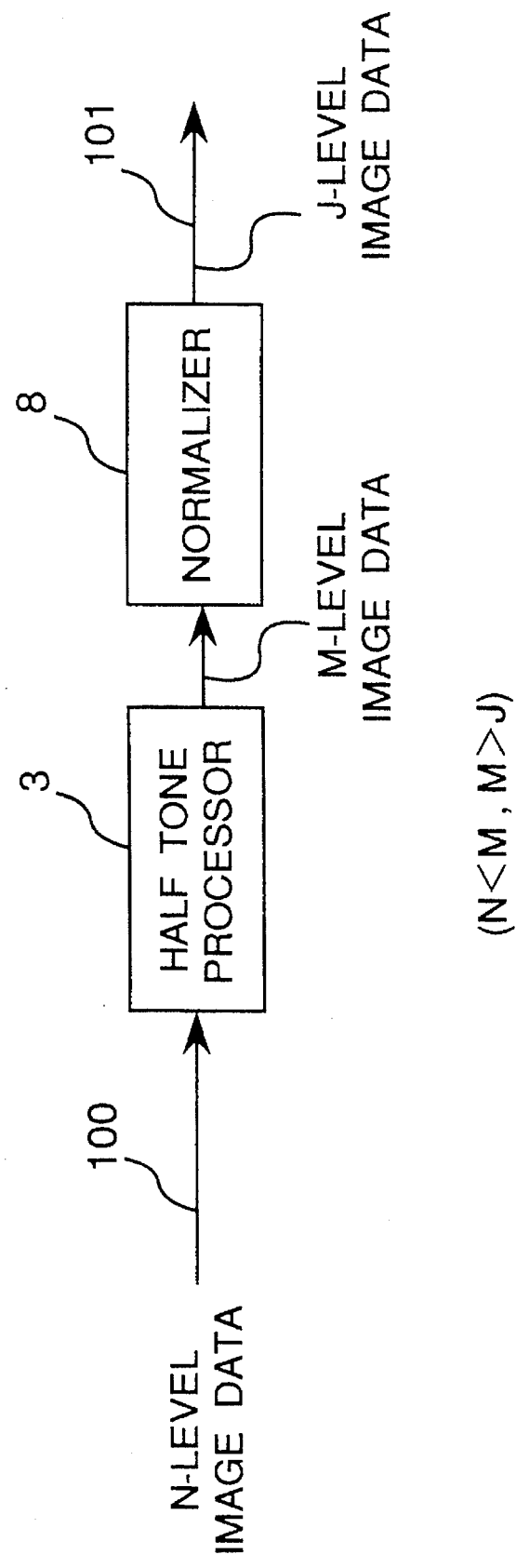
FIG. 16 is a block diagram of a normalizing circuit.

When the number of gray levels is required to express 32 or more levels, but the output device 6 has a modulator only 17 levels per one pixel, it is necessary to turn the estimating number of M-level to 32 levels or more and further to convert to 17-level image data through the normalizing process. In such case, the M-level output of the halftone processor 3 is estimated, e.g., by five bits/pixel and converted further to a J-level image (M>J) by the normalization process. The J-level image is the output of the multi-level image data obtained by the digital halftone process by 17 levels per pixels. The pseudo areal gradation process is realized by providing a normalizing circuit 8 after the halftone processor 3 of the first or second embodiment, as indicated in FIG. 16. The normalizing circuit 8 is formed in the same structure as shown in FIG. 9.

Next, the process for depicting an image will be described in detail below. FIGS. 17, 18, 19, 20 are respectively a table of commands transmitted from the computer 7, formats of the commands of FIG. 17, an explanatory diagram of an identifier DF of a command IM, and an exemplifying diagram of images processed by the commands.

Figure 18:
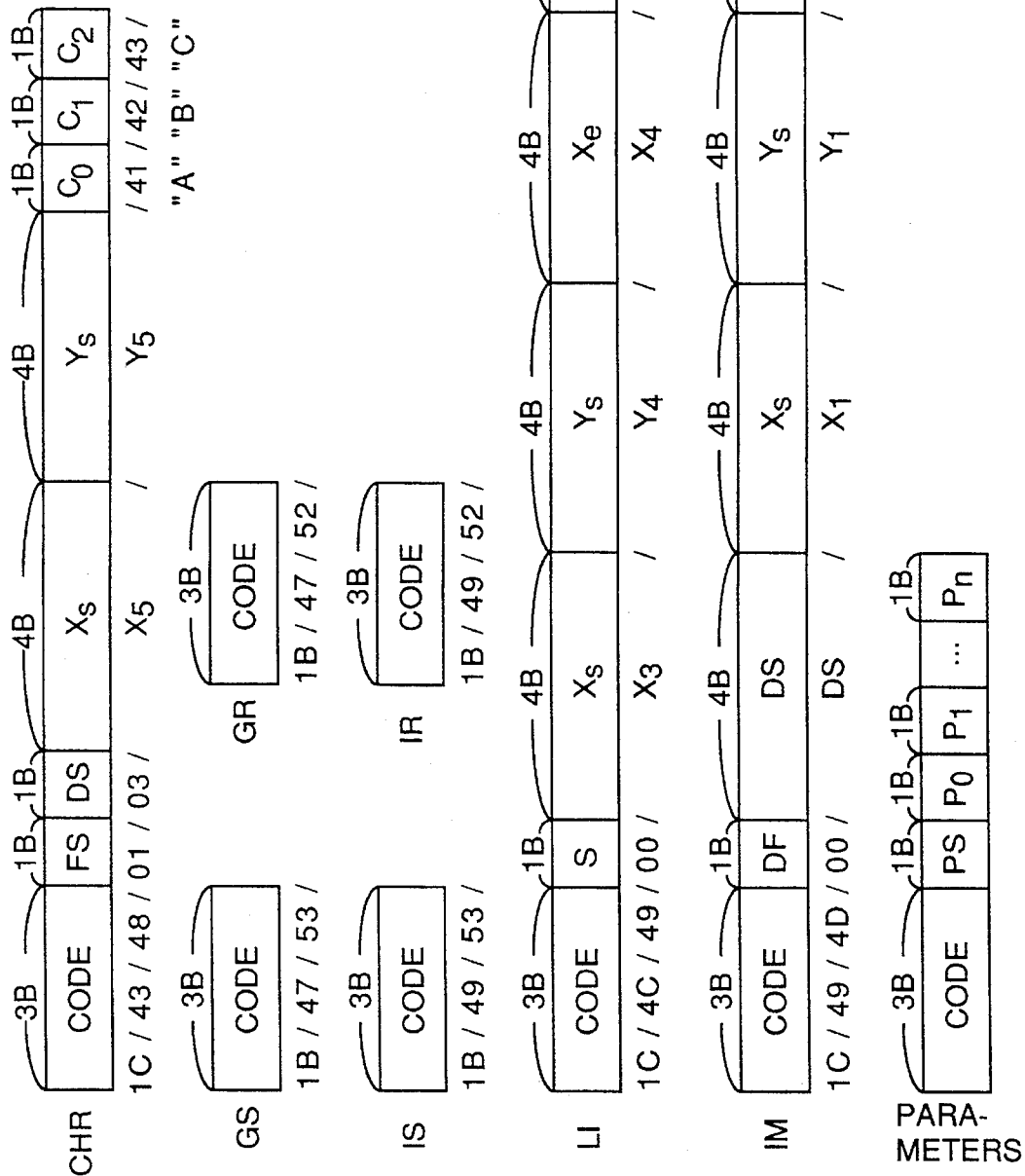
FIG. 18 is a explanatory diagram showing formats using the commands shown in FIG. 17.
Figure 20:
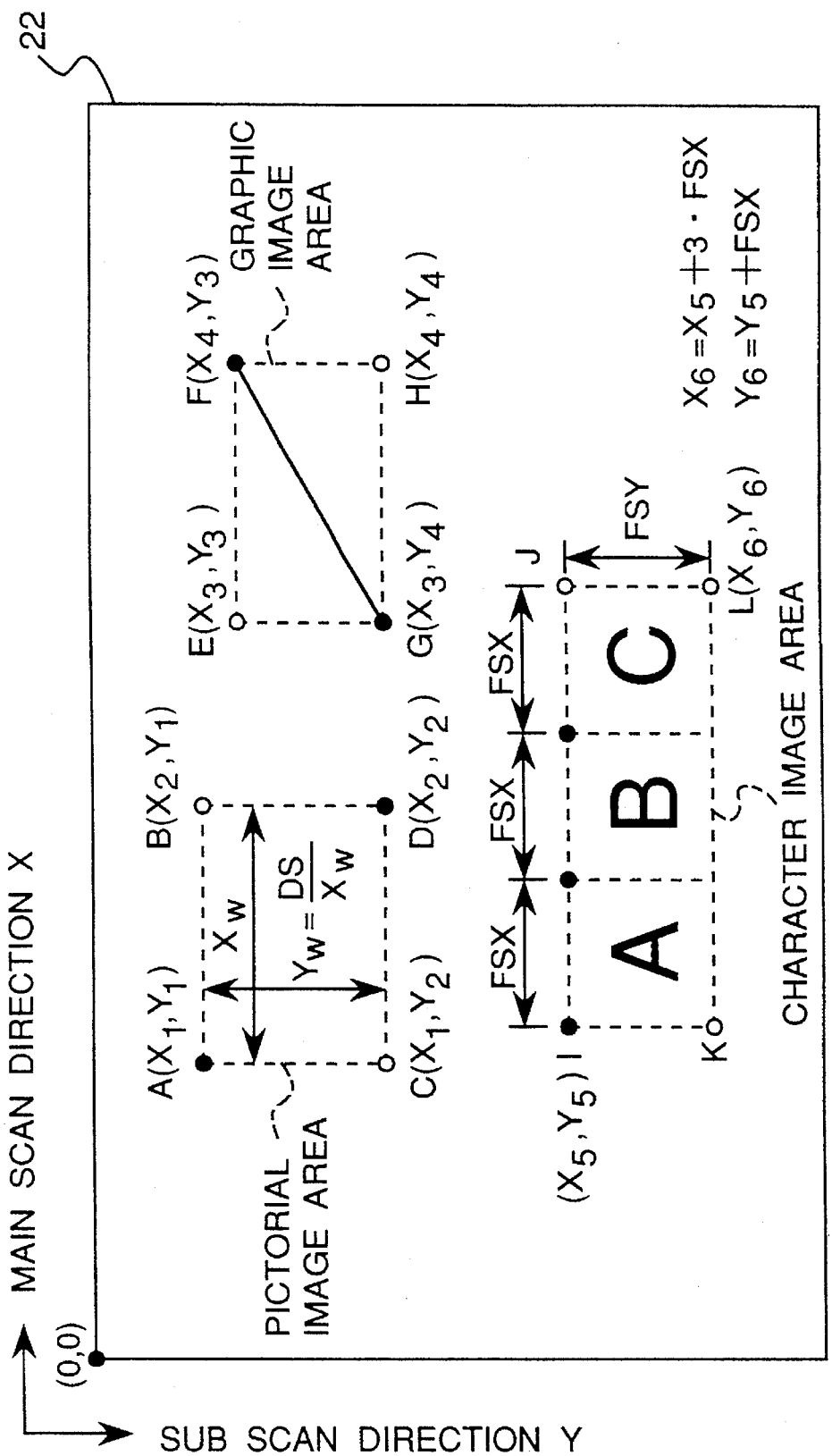
FIG. 20 is a diagram showing the plotting areas for storing different image data in a memory and also showing coordinates of plotting areas.

In an example of FIG. 20 when characters "A", "B" and "C" are to be plotted in the area IJLK, a command CHR shown in FIG. 18 is transmitted from the computer 7. A CODE representing the command CHR is sent by three bytes of 1Ch, 43h and 48h in which the suffix "h" indicates the hexadecimal numbering system. A character size FS is sent by one byte of 01h, the number of characters DS (i.e., three in the example) by one byte of 03h, coordinates (Xs, Ys), equal to ($X_5$, $Y_5$) in the present example, indicating the top left corner of the character image area respectively by four bytes in the binary system (referred to as b hereinafter), and character codes C0, C1, C2 representing "A", "B", "C" by one byte of 41h, 42h, 43h.

Thus defined data is sequentially received by the receiving buffer circuit 11 and analyzed in the command analyzer 12. The command analyzer 12 recognizes CHR from CODE of the first three bytes and also recognizes that the characters of the image are of the size FSX in the main scanning direction and FSY in the sub scanning direction from the character size FS of the identifier, thereby operating the area IJKL from the number of characters DS. The coordinates (X6,Y6) of at right bottom point L is accordingly X6=X5+3FSX and Y6=Y5+FSY. The analyzing content, namely, character positional coordinates CHR(X6,Y6) and character sizes FS, FSX, FSY are designated to be processed in the character processing circuit 14a, and at the same time, character coordinates CHR(X5,Y5), CHR(X6,Y6) are output to the area setting circuit 13. The character image processor 14a processes characters "A", "B" and "C" and stores the bit map data of these characters in the image memory 22 at address specified by the analyzed command.

Next, the description is directed to the plotting of a straight line through graphic processing in the area EFGH of FIG. 20.

Commands GS, LI and GR of FIG. 18 are supplied from the computer 7. Command GS indicates to set the graphic mode, and command GR indicates to release the graphic mode and return the mode back to the character mode again.

The command analyzer 12 is brought into the graphic mode by CODE of GS command of three bytes of 1Bh, 47h and 53h, and returned similarly to the character mode by CODE of GR command of three bytes of 1Bh, 47h and 52h. A graphic processor 15 is designated in the graphic mode. Subsequent to the transmission of GS command, a CODE representing LI command to process a straight line is sent out by three bytes of 1Ch, 4Ch and 49h, then the type of line S is transmitted by one byte of 00h, followed by coordinates (X3,Y4), (X4,Y3) of the image position each by four bytes in the binary system. Accordingly, LI command is recognized from CODE of the first three bytes and it is detected from the line type S of the identifier that a straight line should be a solid line. The area EFGH is determined as the coordinates are designated. The analyzing result, i.e., line positional coordinates LI(X3,Y4), LI(X4,Y3) and the line type S are supplied to the graphic processor 15, and the graphic coordinates LI(X3,Y3), LI(X4,Y4) are output to the area setting circuit 13. The graphic processor 15 processes a straight line GF to the image memory 22 in accordance with the above analyzing result. After processing of the line, the command analyzer 12 is returned to the character mode by CODE of GR command of three bytes of 1Bh, 47h and 52h.

The operation when a pictorial image is processed in the area ABCD of FIG. 20 will be described next.

Command IS, IM and IR shown in FIG. 18 are supplied from the computer 7. Command IS means to enter the pictorial mode, and command IR indicates to release the pictorial mode.

The command analyzer 12 is changed to the pictorial mode by CODE of command IS of three bytes of 1Bh, 49h and 53h. Likewise, the command analyzer 12 is returned to the character mode by CODE of command IR of three bytes of 1Bh, 49h and 52h. During the pictorial mode, the pictorial processor 16 is designated. After command IS is supplied, a CODE representing a pictorial processing command IM is sent by three bytes of 1Ch, 49h and 4Dh, a compression method DF by one byte of 00h, a transmission data length DS subsequent to the coordinate parameter by four bytes in the binary system, and coordinates of the image position (Xs,Ys), equal to (X$_1$, Y$_1$) in the present example, each by four bytes in the binary system, a main scanning width Xw by four bytes in the binary system and a pictorial data Dn. Command IM is recognized from CODE, and it is found that a bit map image is designated from the compression method DF, and the area ABCD is determined from the data length DS and the main scanning length Xw. That is, X2=X1+Xw and Y2=Y1+DS/Xw are calculated.

As a result of the analysis in the command analyzer 12, the coordinates of the pictorial image position IM(X1,Y1), IM(X2,Y2) and the compression method DF are sent to the pictorial image processor 16, and simultaneously the coordinates IM(X1,Y1), IM(X2,Y2) are output to the area setting circuit 13. The pictorial image processor 16 processes the pictorial image to the image memory 22 in accordance with the command. The character mode is restored by CODE of command IR after the pictorial image is processed.

The identifier DF showing the compression method is represented, for example, as indicated in FIG. 19. The pictorial image processor 16 executes an extension process corresponding to the identifier DF. DF=00h is a bit map data and not compressed, and therefore never being a subject to the extension process. The extension data or bit map data is converted from the K-level image to the N-level image by the circuit shown in FIG. 12, and stored in the image memory 22.

Figure 21:
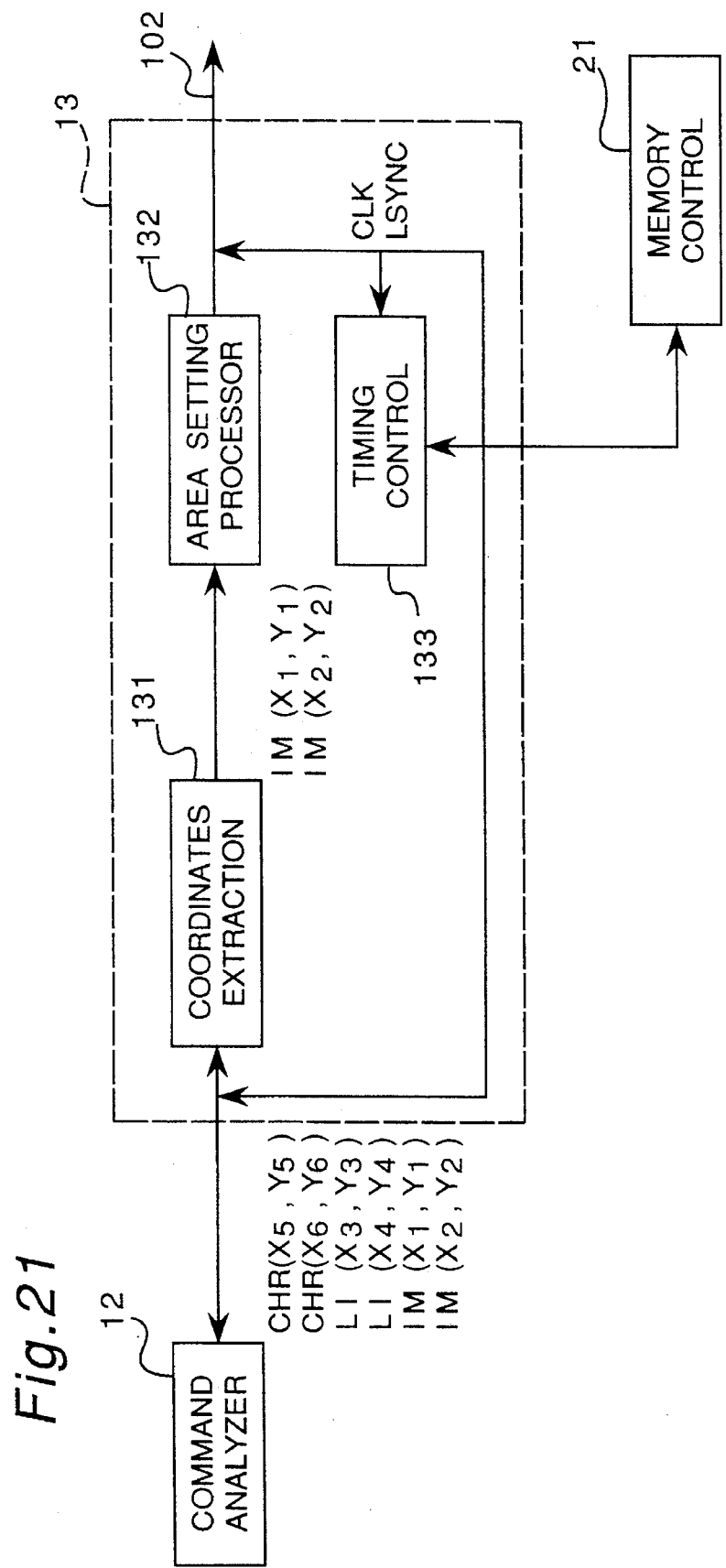
FIG. 21 is a block diagram of the area setting circuit.

Referring to FIG. 21, a detail of the area setting circuit 13 is shown.

A coordinate extracting circuit 131 receives the coordinates CHR(X5,Y5), CHR(X6,Y6), LI(X3,Y3), LI(X4,Y4), IM(X1,Y1), IM(X2,Y2) from the command analyzer 12, and extracts coordinates IM(Xl,Y1), IM(X2,Y2) indicating the pictorial image area ABCD by the use of output code. For the above output code, codes of CHR, LI, IM commands may be set, e.g., in the format of FIG. 18 to designate a parameter, thereby to deliver the coordinates by a parameter Pn.

The extracted coordinates, i.e., X1, X2, Y1 and Y2 are set by an area setting processor 132 respectively in the registers 51a, 51b, 51e and 51f of the switching circuit 51 via the signal line 102. A timing controlling circuit 133 controls the timing between the memory controller 21 and the switching circuit 51.

Figure 22:
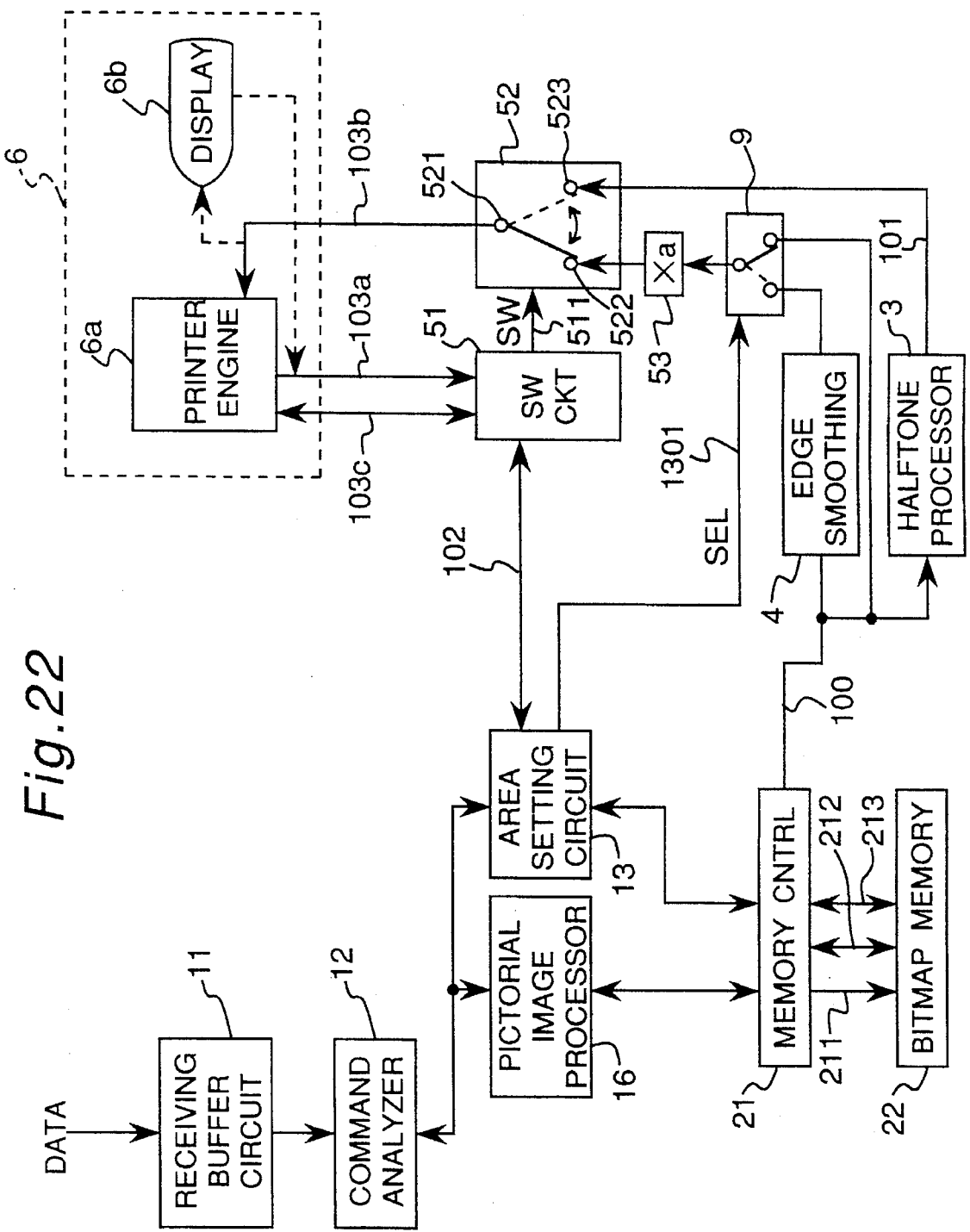
FIG. 22 is a block diagram of the image controller of the third embodiment.

Referring to FIG. 22 a block diagram of an image controller according to the third embodiment of the present invention is shown, in which the character image processor 14a and the graphic image processor 15 are removed because the character image processing and the graphic image processing are carried in the computer 7. The third embodiment is different from the first and second embodiments in that (1) both the character image processor 14a and the graphic image processor 15 are removed; and (2) a switch 9 is provided which operates in response to a signal SEL1301 from the area setting circuit 13, thereby to select either one of the outputs from the edge smoothing circuit 4 and the image memory 22. The other circuit structure is the same. The signal SEL1301 of the area setting circuit 13 is designated by the command analyzer 12 when the command analyzer 12 analyzes the receiving command.

Character or graphic image data is also transmitted by the computer 7 as well as pictorial image data. In this case, it is necessary to distinguish the halftone pictorial image such as a photograph or the like from the character or graphic image.

For distinguishing the image as referred to above, in a first method, when the graphic image is to be transmitted, commands GS, IM and GR of FIG. 17 are output in this order. Meanwhile, when the halftone pictorial image is to be sent, commands IS, IM and IR are sent out in this order. If it is not indicated to change the mode, it is recognized that the character image is to be transmitted, and the command analyzer 12 carries out the corresponding process.

In a second method, only the command IM of FIG. 17 is used. The character, graphic and halftone pictorial images are recognized with the use of the identifier DF in command IM in the format of FIG. 19. The character, graphic and halftone pictorial images are recognized respectively through 05h, 06h and 07h codes.

In a third method, similar to the second method as above, only the command IM is used, but 00h–04h codes of the identifier DF in the format of FIG. 19 are utilized. That is, the character, graphic and halftone pictorial images are recognized from the difference of the compression method. For instance, it becomes possible to recognize the images if the character image is defined by 01h code, the graphic image is defined by 03h code and the halftone pictorial image is defined by 04h code. The definition of the codes is made in accordance with the format to designate the parameter as shown in FIG. 18 and the codes may be received from the computer 7.

According to one of the above methods, the command analyzer 12 processes the area ABCD as a halftone pictorial image command IM, the area EFGH as a graphic image command LI and the area IJKL as a character image command CHR.

The coordinates (Xs,Ys) and (Xe,Ye) are determined from IM command such that the binary values of the coordinates (Xs,Ys) are directly read from the IM command and the binary values of the coordinates (Xe,Ye) are calculated using the coordinates (Xs,Ys), the binary value of the main scanning length Xw and the data length DS. In other words, Xe=Xs+Xw and Ye=Ys+DS/Xw. As a result, the character coordinates CHR, graphic coordinates LI and halftone coordinates IM are output as coordinates CHR(X5,Y5), CHR(X6,Y6), LI(X3,Y3), LI(X4,Y4), IM(X1,Y1) and IM(X2,Y2) to the area setting circuit 13.

In the area setting circuit 13, the coordinate extracting circuit 131 receives the coordinates CHR(X5,Y5), CHR(X6,Y6), LI(X3,Y3), LI(X4,Y4), IM(X1,Y1) and IM(X2,Y2) generated from the command analyzer 12, but extracts only the coordinates IM(X1,Y1), IM(X2,Y2) of the image area ABCD by the output code. The output code is obtained, for example, by setting codes of commands CHR, LI and IM in the format of FIG. 18 to designate the parameter and can be delivered by the parameter Pn.

The extracted coordinates are, through the signal line 102, set in the switching circuit 51 by the area setting processor 132. More specifically, X1 is set in the register 51a, X2 is set in the register 51b, Y1 in the register 51e and Y2 in the register 51f, respectively.

As described hereinabove, in the third embodiment of the present invention, even if only the pictorial image is transmitted from the computer 7, the switch 52 is switched to select the image data of the edge smoothing circuit 4 or image memory 22 for the character image area or graphic image area, or the output data of the halftone processor 3 for the halftone pictorial image area in accordance with the signal from the switching circuit 51 when the character images, graphic images and halftone pictorial images stored in the image memory 22 are output to the output device 6.

Figure 23:
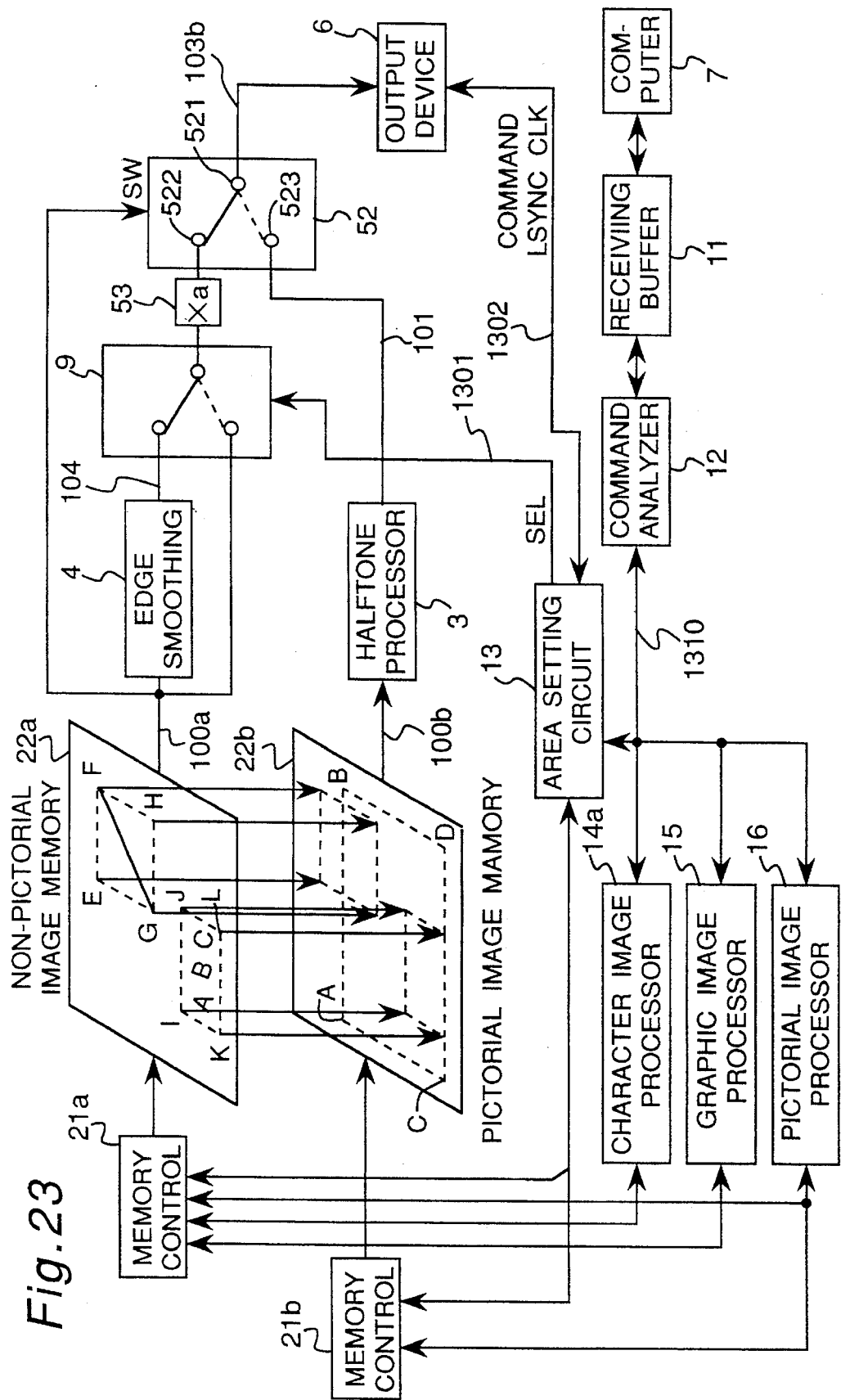
FIG. 23 is a block diagram of the image controller of the fourth embodiment.

FIG. 23 is a block diagram of an image controller according to a fourth embodiment of the present invention. The differences of the fourth embodiment are (1) the image memory 22 includes a non-pictorial image memory 22a for storing character and/or graphic image data and a pictorial image memory 22b for storing pictorial image data; (2) the switch 52 is automatically switched with the use of the output character and/or graphic data stored in the image memory 22a; (3) the switch 9 is operated by the signal SEL1301 from the area setting circuit 13, thereby to select the output of the edge smoothing circuit 4 or the image memory 22a; and (4) the switching circuit 51 is omitted and a synchronous signal line 1302 is added. The other points in the circuit structure of the image controller of the fourth embodiment are the same as the first through third embodiments.

As is clear from FIG. 23, the coordinate extracting circuit 131 and the area setting processor 132 of the area setting circuit 13 shown in FIG. 21 becomes unnecessary in the fourth embodiment. The character image processor 14a and the graphic image processor 15 process the image through the memory controller 21a to the image memory 22a. The pictorial image processor 16 processes the image through the memory controller 21b to the image memory 22b. A timing controlling circuit 133 synchronizes with and feeds/receives a parameter command to the output device 6 via the signal line 1302. The signal SEL 1302 is designated by the command analyzer 12 when the circuit 12 analyzes the received command.

When the signal 100a is "H", the switch 52 selects the terminal 522. When the signal 100a is "L", the terminal 523 is selected. When the signal 100a is "H", it means that the non-pictorial image area, i.e., character or graphic image area, is being processed, so that the non-pictorial image area is extracted with good accuracy, and the switch 52 is automatically operated. Owing to this arrangement, even if the non-pictorial image area and the pictorial image area are overlapped, it is possible to change over the switch 52.

The command analyzer 12 can recognize the character, graphic and pictorial images from commands CHR, GS and IS of FIG. 17. In the case of the character image, the command analyzer 12 indicates the character image processor 14a to work. The graphic image processor 15 and the pictorial image processor 16 are designated when the graphic image and pictorial image are to be processed.

When the computer 7 processes the non-pictorial image as in the example of FIG. 22, the kind of the transmitted pictorial image is distinguished in the same manner as in the third embodiment, and the pictorial image processor 16 is instructed so as to process the non-pictorial image to the image memory 22a and the halftone pictorial image to the image memory 22b, respectively. In this case, the character image processor 14a and the graphic image processor 15 are not required.

In the fourth embodiment, as the command transmitted from the computer 7 is analyzed, the non-pictorial and pictorial images can be processed at different image memories. Since the switch 52 is controlled with the use of the output data of the non-pictorial image memory, the area can be automatically switched. Moreover, even if the non-pictorial areas and pictorial area are overlapped, it is possible to process the image in different manners between the nonpictorial image areas and the pictorial image area. Accordingly, the image data of the edge smoothing circuit 4 or image memory 22 is selected for the non-pictorial image areas and the output image data from the halftone processor 3 is selected for the halftone pictorial image area.

Figure 24:
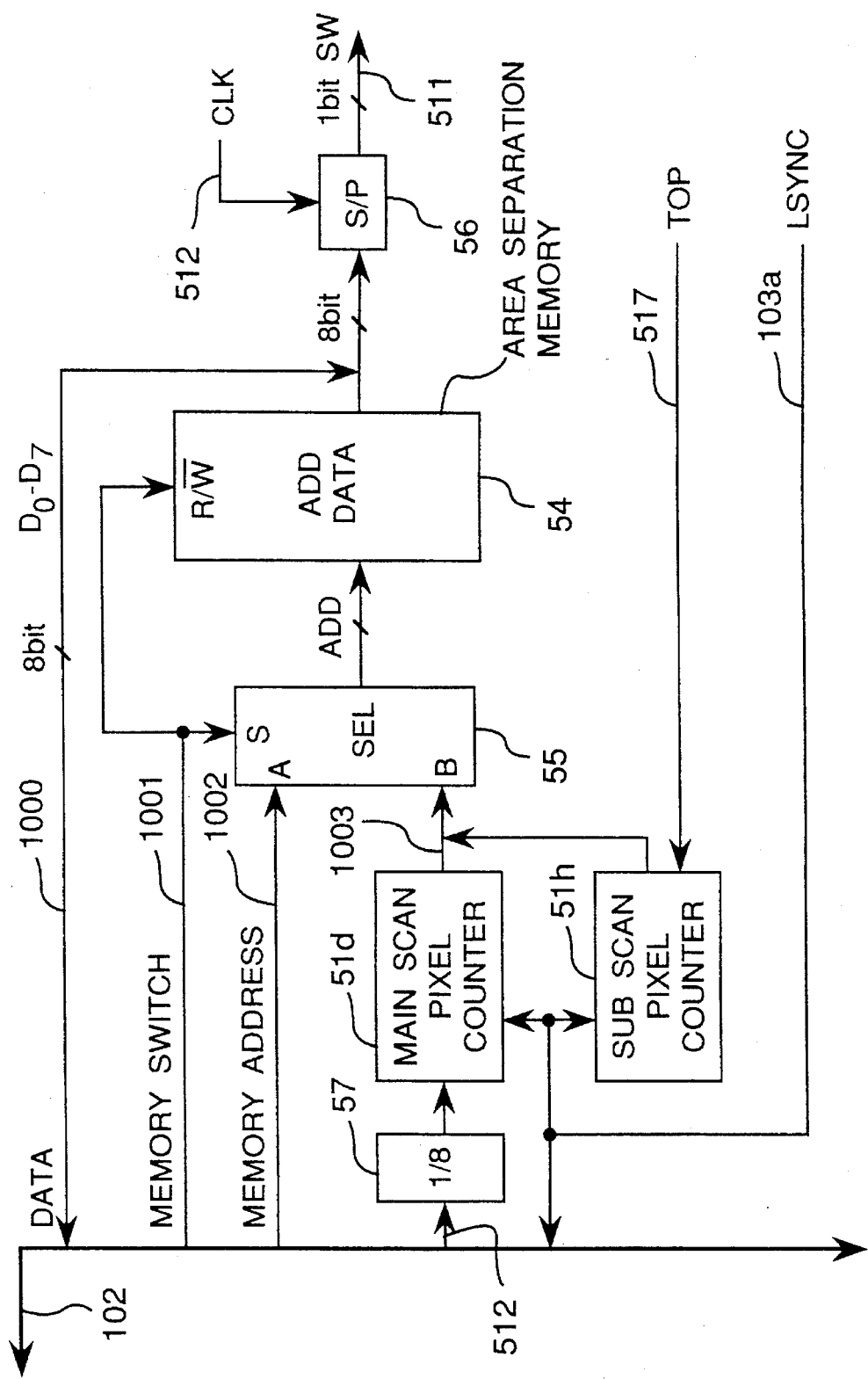
FIG. 24 is a block diagram of a modification of the switching circuit.

FIG. 24 is an improvement of the switching circuit 51. In FIG. 24, the registers 51a, 51b, 51e and 51f of FIG. 6 are replaced with an area separating memory 54, which makes it possible to set an area of any shape, not restricted to a rectangular area.

The area setting processor 132 in FIG. 21 allows the selecting circuit 55 to select a memory address signal 1002 by turning a memory switching signal 1001 to "L", with changing the R/W- control of the area separating memory 54 to W- (Write). As a result, the area separating memory 54 is enabled to write an area pattern by byte unit by means of a data signal 1000. "H" data is written in the pictorial image area, and "L" data is written in the non-pictorial (character and/or graphic) image area. After the data is written, the memory switching signal 1001 is turned to "H" by the area setting processor 132, so that the selecting circuit 55 selects the memory address signal 1003 and, at the same time, R/W-control of the area separating memory 54 is changed to R (Read). As the area setting memory 54 becomes able to read, the output data is converted to a switching signal SW511 of one bit by an S/P converter 56.

The address signal 1003 generates an address corresponding to the output of the image memory 22 by the main scanning pixel counter 51*d* and sub scanning pixel counter 51*h*. The clock LCK 512 is divided to ⅛ the frequency by a frequency demultiplier and output to the main scanning pixel counter 51*d*. Accordingly, the 8-bit output from the area separating memory 54 is converted to the one-bit switching signal SW511 by the S/P converter 56.

The first and second embodiments are embodied in a color image controller as well. In this case, the memory circuit 2 should be adapted to store red, green and blue data, or yellow, magenta, cyan and black data, and the halftone processor 3, edge smoothing circuit 4 and selecting circuit 5 should be constituted in a plurality of stages in accordance with the structure of the memory circuit 2. If the output device 6 is capable of outputting colors serially, the halftone processor 3, edge smoothing circuit 4 and selecting circuit 5 are not necessary to be formed in a plurality of stages, and the output of the memory circuit 2 should be sequentially selected to the output device 6. The output device 6 composes colors of red, green and blue, or yellow, magenta, cyan and black.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image controller for processing one frame image data containing N-level pictorial image data and N-level non-pictorial image data, comprising:

memory means for storing said one frame image data containing said N-level pictorial image data at a first area and said N-level non-pictorial image data at least at a second area;

control means for generating a first address corresponding to said first area in said memory means and a second address corresponding to said second area in said memory means;

reading means for reading said one frame image data from said memory means and for producing N-level pictorial image data and N-level non-pictorial image data;

halftone processor means coupled to said reading means for converting said N-level pictorial image data and N-level non-pictorial image data to M-level pictorial image data and M-level non-pictorial image data, respectively (N<M);

normalizing means, coupled to said reading means, for normalizing said N-level pictorial image data and N-level non-pictorial image data to normalized pictorial image data and normalized non-pictorial image data, respectively; and selecting means for selecting said M-level pictorial image data from said halftone processor means during the reading of said first area as indicated by said first address, and for selecting said normalized non-pictorial image data from said normalizing means during the reading of said second area as indicated by said second address.

2. An image controller as claimed in claim 1, further comprising edge smoothing means connected to said reading means for producing an edge smoothed image data, and wherein said selecting means selects said M-level pictorial image data during the reading of said preselected area, and for selecting said edge smoothed image data during the reading of said further preselected area.

3. An image controller as claimed in claim 1, wherein said memory means is a bit map memory.

4. An image controller as claimed in claim 1, wherein said reading means reads said image data in raster format.

5. An image controller as claimed in claim 1, wherein said N-level non-pictorial image data is any one selected from character data and graphic data.

6. An image controller as claimed in claim 1, further comprising a printer for printing one frame image data produced from said selecting means.

7. An image controller as claimed in claim 1, further comprising a display for displaying one frame image data produced from said selecting means.

8. An image controller for processing one frame image containing N-level pictorial image data and N-level non-pictorial image data each presented in data aggregates, comprising:

analyzing means for analyzing said data aggregates;

memory means for storing said N-level pictorial image data at a preselected area and said N-level non-pictorial image data at least at a further preselected area wherein said preselected area and said further preselected area are defined by respective ones of said data aggregates;

control means for generating a first address corresponding to said preselected area in said memory means and a second address corresponding to said further preselected area in said memory means;

for reading said N-level pictorial image data and said N-level non-pictorial image data from said memory means at said first address and said second address, respectively;

halftone processor means coupled to said reading means for converting said N-level pictorial image data to an M-level pictorial image data (N<M); and selecting means for selecting said M-level pictorial image data from said halftone processor means during the reading of said preselected areas, and for selecting said N-level non-pictorial image data from said reading means during the reading of said further preselected area.

9. An image controller as claimed in claim 8, further comprising edge smoothing means connected to said reading means for producing an edge smoothed image data, and wherein said selecting means selects said M-level pictorial image data during the reading of said preselected area, and for selecting said edge smoothed image data during the reading of said further preselected area.

10. An image controller as claimed in claim 8, wherein said memory means is a bit map memory.

11. An image controller as claimed in claim 8, wherein said reading means reads said image data in raster format.

12. An image controller as claimed in claim 8, wherein said non-pictorial image data is any one selected from character data and graphic data.

13. An image controller as claimed in claim 8, further comprising a printer for printing one frame image data produced from said selecting means.

14. An image controller as claimed in claim 8, further comprising a display for displaying one frame image data produced from said selecting means.

15. An image controller for processing one frame image data containing N-level pictorial image data and 2-level non-pictorial image data, comprising:

first memory means for storing N-level pictorial image data at a first preselected area having a first address space;

second memory means for storing 2-level non-pictorial image data at a second preselected area having a second address space corresponding to and at least partially overlapping said first preselected area;

halftone processor means coupled to said first memory means for converting said N-level pictorial image data to an M-level pictorial image data (N<M); and selecting means for selecting said M-level pictorial image data from said halftone processor means responsive to a first value stored in an address in said second address space where said 2-level non-pictorial image data is and for selecting at least one of:

a) said 2-level non-pictorial image data from said second memory means and b) edge smoothed 2-level non-pictorial image data from edge smoothing means coupled to said second memory means for producing an edge smoothed said 2-level non-pictorial image data responsive to a second value stored in said address in said second address space where said 2-level non-pictorial image data is stored.

16. An image controller as claimed in claim 15, wherein each of said first and second memory means is a bit map memory.

17. An image controller as claimed in claim 15, wherein said 2-level non-pictorial image data is any one selected from character data and graphic data.

18. An image controller as claimed in claim 15, further comprising a printer for printing one frame of image data produced from said selecting means.

19. An image controller as claimed in claim 15, further comprising a display for displaying one frame of image data produced from said selecting means.

* * * * *

UNITED STATES PATENT AND TRADE MARK OFFICE
CERTIFICATE OF CORRECTION

PATENT NO. : 5,570,432
DATED : October 29, 1996
INVENTOR(S) : Kojima

It is certified that error appears in the above-identified patent and that said Letters Patent is hereby corrected as shown below:

On the cover page, item [30], Foreign Application Priority Data, delete "4-20772" and insert --4-207772--.

On the cover page, item [56], References Cited, the following references need to be listed:

U.S. PATENT DOCUMENTS 4,847,641   7/1989   Tung

OTHER PUBLICATIONS

Jim Heid, "One Scanner, Two Laser Writers", MACWORLD, (November 1991).

Column 20, line 40, before the word "for" insert --reading means for receiving said first address and said second address and--.

Signed and Sealed this

Seventeenth Day of June, 1997

*Attest:*

BRUCE LEHMAN

*Attesting Officer*    Commissioner of Patents and Trademarks